United States Patent
Wang et al.

(10) Patent No.: US 10,282,385 B2
(45) Date of Patent: May 7, 2019

(54) ESTIMATION OF OIL RECOVERY IN FOAM FLOODED HYDROCARBON RESERVOIRS

(71) Applicants: Xiangzeng Wang, Xi'an (CN); Shubao Wang, Xi'an (CN); Ruimin Gao, Xi'an (CN); Yongchao Yang, Xi'an (CN); Fanhua Zeng, Regina (CA); Jun Yang, Regina (CA); Yizhong Zhang, Regina (CA)

(72) Inventors: Xiangzeng Wang, Xi'an (CN); Shubao Wang, Xi'an (CN); Ruimin Gao, Xi'an (CN); Yongchao Yang, Xi'an (CN); Fanhua Zeng, Regina (CA); Jun Yang, Regina (CA); Yizhong Zhang, Regina (CA)

(*) Notice: Subject to any disclaimer, the term of this patent is extended or adjusted under 35 U.S.C. 154(b) by 530 days.

(21) Appl. No.: 14/977,923

(22) Filed: Dec. 22, 2015

(65) Prior Publication Data

US 2017/0175493 A1   Jun. 22, 2017

(51) Int. Cl.
| | |
|---|---|
| *G06F 17/11* | (2006.01) |
| *E21B 43/16* | (2006.01) |
| *G01V 11/00* | (2006.01) |

(52) U.S. Cl.
CPC ............ *G06F 17/11* (2013.01); *E21B 43/166* (2013.01); *G01V 11/00* (2013.01); *G06F 2217/16* (2013.01)

(58) Field of Classification Search
CPC .... G06F 17/11; G06F 2217/16; E21B 43/166; G01V 11/00
See application file for complete search history.

(56) References Cited

U.S. PATENT DOCUMENTS

2017/0044425 A1*  2/2017  Barati Ghahfarokhi .................... C09K 8/594

OTHER PUBLICATIONS

Sunmonu, R. M., & Onyekonwu, M.; Enhanced Oil Recovery using Foam Injection; a Mechanistic Approach; Society of Petroleum Engineers; Aug. 5, 2013; 13 pages (Year: 2013).*
Shrivastava, V. K., Singhal, A. K., Coombe, D. A., & Belgrave, J. D. M.; Numerical Simulation of Foam Flooding for Sweep Improvement; Petroleum Society of Canada; Jan. 1, 1997; 17 pages (Year: 1997).*
Liu, M., Andrianov, A., & Rossen, W. R.; Sweep Efficiency in CO2 Foam Simulations with Oil; Society of Petroleum Engineers; Jan. 1, 2011; 18 pages (Year: 2011).*
Ferno, M. A., Gauteplass, J., Pancharoen, M., Haugen, A., Graue, A., Kovscek, A. R., & Hirasaki, G. J.; Experimental Study of Foam Generation, Sweep Efficiency and Flow in a Fracture Network; Society of Petroleum Engineers; Oct. 27, 2014; 14 pages (Year: 2014).*

* cited by examiner

*Primary Examiner* — S. Sough
*Assistant Examiner* — Kimberly L Jordan
(74) *Attorney, Agent, or Firm* — Shumaker, Loop & Kendrick, LLP

(57) ABSTRACT

A method for the estimation of oil recovery factor in a foam flooded hydrocarbon reservoir. The hydrocarbon reservoir is divided into three sweep sub-zones, with sweep efficiency and displacement efficiency for each zone being estimated. The oil recovery factor is determined as a function of porous volume injected, based on the sweep efficiency and displacement efficiency.

26 Claims, 19 Drawing Sheets

ESTIMATION OF OIL RECOVERY IN FOAM FLOODED HYDROCARBON RESERVOIRS

TECHNICAL FIELD

The invention relates to oil recovery from a hydrocarbon reservoir. More specifically it relates to a method for the estimation of the oil recovery factor from a reservoir sweep zone within a hydrocarbon reservoir using foam flooding enhanced oil recovery techniques.

BACKGROUND

Conventional methods of oil recovery do not exploit anywhere near all of the oil enclosed in reservoir rock. Many types of enhanced oil recovery methods are used to enhance extraction—including gas, liquid or steam flooding of the reservoir to extract residual oil. In 1950s, foam flooding was proposed as a displacement system to enhance oil recovery factor. Since the 1960s, lots of experiments and field tests were introduced, and verified the effectiveness of foam flooding in enhanced oil recovery, especially for heterogeneous reservoirs.

In reservoir flooding operations, surfactants are often used to help form emulsions between an aqueous flooding solution, for example, and the hydrophobic oil—separation of the oil from rock is enhanced. Flooding with other gases or steam often also employs foam-forming surfactants—foam flooding is an enhanced oil recovery process in which foam is injected into a reservoir to improve the sweep efficiency of a driving fluid. Foam can be generated either in the reservoir pore space or at the surface before injection. Foam flooding mitigates sweep inhomogeneities such as those caused by layers with higher permeability than the surrounding formations, or those caused by gravity override.

Foam is a dispersion system formed by mixing gas, such as air, nitrogen, $CO_2$ and so on, into liquid phase with the involvement of at least one foaming agent. In the oil industry, gas being used to generate foam is chosen from air, nitrogen, $CO_2$, or natural gas, and liquid being used to generate foam is mainly water, such as fresh water, formation water or brine.

Foam flooding is also is being proposed as an effective way to recover tight reservoirs with extreme low permeability. One of the issues associated with recovery from these types of reservoirs is the estimation of oil recovery factor. A method of enhanced modeling or calculation of the oil recovery factor from a flooded hydrocarbon reservoir of this nature would it is believed be positively received.

There are two key limitations to current modeling methods for the estimation of oil recovery factor from a hydrocarbon reservoir. These include the actual speed of rendering of calculations, as well as the accuracy of the model. From an accuracy perspective, it is difficult to accurately estimate the oil recovery factor from a hydrocarbon reservoir subjected to foam flooding because of the need to accurately estimate sweep efficiency through the reservoir. As the permeability of the reservoir becomes lower, or the geology of the reservoir becomes more complicated, it is more difficult to come up with a proper single equation which can be used to reasonably accurately estimate oil recovery factor in such circumstances. As such, and oil recovery factor modeling method which overcame some of these limitations or rendered a more accurate result than the prior art approaches is it is believed desirable from the perspective of more accurate modeling and use of foam flooding enhanced oil recovery techniques.

One of the other limitations in current prior art approaches is the computing power required to calculate the sweep efficiency and other variables required to estimate oil recovery factor. The development of single large equations used to render oil recovery factor estimates, relying on large amounts of point data and the like from the formation of the hydrocarbon reservoir, is another limitation to the efficient use of such modeling techniques in either the planning or execution of foam flooding projects. If it was possible to come up with a revised method for the estimation of oil recovery factor in a foam flooded hydrocarbon reservoir which required less computing power or rendered quicker results than the prior art methods, it is also believed that this would positively be perceived.

BRIEF SUMMARY

The present invention, a method of estimating oil recovery factor from a foam flooded reservoir, represents an improvement over current methods insofar as it provides a more granular calculation approach resulting in a more accurate estimate of oil recovery factor within a reservoir sweep zone of a hydrocarbon reservoir than currently practiced methods.

The present invention, a method of estimating oil recovery factor from a foam flooded reservoir, also represents an enhancement over current methods of estimation of oil recovery factor within a hydrocarbon reservoir insofar as by parsing the calculation and estimation into a plurality of sweep sub-zones based on the understanding of reservoir and flooding parameters results in the ability to more quickly calculate the results of the model for each flooding cycle forecast within the flooding operation.

The present invention, a method of estimating oil recovery factor from a foam flooded reservoir, accomplishes its objectives comprising in a first step the definition of a reservoir sweep zone, being the area within a hydrocarbon reservoir between at least one injection well and at least one production well, wherein gas and liquid surfactant injected into the at least one injection well in at least one flooding cycle will sweep oil through the reservoir sweep zone towards the at least one production well for extraction therefrom. As outlined herein, the definition of the reservoir sweep zone will be understood to those skilled in the art of hydrocarbon geology and the planning and execution of enhanced oil recovery flooding projects. The definition of the reservoir sweep zone along with the location of the at least one production well and the at least one injection well are important initial considerations from the perspective of the modeling method outlined herein as well as in the larger scale planning of the flooding project in question.

The oil recovery factor calculation method of the present invention could be used to calculate oil recovery factor within a hydrocarbon reservoir for each flooding cycle within the flooding operation. Each flooding cycle typically consists of the injection of a slug of gas and the slug of surfactant fluid into the geology or formation of the hydrocarbon reservoir. While the method of calculation and estimation hereof could be used for the estimation of a single slug or flooding cycle is specifically contemplated that the utility of the method would be highest in the calculation of oil recovery factor for reservoir for a plurality of flooding cycles within a flooding operation.

Following definition of the reservoir sweep zone the next step of the method, which is completed for some or all of the flooding cycles in the flooding operation comprises first determining reservoir and flooding parameters with respect to the reservoir sweep zone based on the current state of gas and liquid surfactant injection into the reservoir sweep zone. The reservoir and flooding parameters could vary depending upon the operator, the operation or the geology of the hydrocarbon reservoir, amongst other factors. As outlined herein, various reservoir and flooding parameters which would be useful in certain embodiments of the method and calculations of the present invention will be apparent to those skilled in the art and all are contemplated within the scope of the present invention.

The next step in the method of estimating oil recovery factor from a foam flooded reservoir of the invention comprises subdividing the reservoir sweep zone into three sweep sub-zones, being a foam sweep sub-zone, a water sweep sub-zone and a gas sweep sub-zone, based upon the reservoir and flooding parameters and the current state of the operating or modeled flooding operation. The sweep sub-zones are redefined for each flooding cycle since the shape and size of each of the sweep sub-zones can dynamically change during the flooding operation dependent upon the various reservoir and flooding parameters.

Following the definition of the three sweep sub-zones, a calculation step is contemplated, within which the following calculations would be made:

a vertical sweep efficiency and a volumetric sweep efficiency within each of the sweep sub-zones;

a total sweep area for the reservoir sweep zone, being the volumetric area of the reservoir sweep zone swept by foam at the moment of the current flooding cycle;

a foam sweep area, being the volumetric area of the foam sweep sub-zone swept by foam at the moment of the current flooding cycle;

water sweep area, being the volumetric area of the water sweep sub-zone swept by water at the moment of the current flooding cycle;

a gas sweep area, being the volumetric area of the gas sweep sub-zone swept by gas at the moment of the current flooding cycle;

a foam breakthrough area, being the volumetric area of the foam sweep sub-zone being broken through by existing foam within the flooding cycle, which includes the foam sweep area and a foam bypass area therearound caused by the mobility difference between foam and oil;

a water breakthrough area, being the volumetric area of the water sweep sub-zone being broken through by existing water within the flooding cycle, which includes the water sweep area and a water bypass area therearound caused by the mobility difference between water and oil;

a gas breakthrough area, being the volumetric area of the gas sweep sub-zone being broken through by existing gas within the flooding cycle, which includes the gas sweep area and a gas bypass area therearound caused by the mobility difference between gas and oil; and a total breakthrough area, being the total of the foam breakthrough area, the water breakthrough area and the gas breakthrough area.

The calculations completed in the calculation step might rely upon the reservoir and flooding parameters as well and it will be understood to those skilled in the art that the specific calculation of each of the variables outlined with respect to the calculation step could include the use of the reservoir and flooding parameters or could in many ways be optimized to yield the most accurate possible results without departing from the intended scope of the invention.

Following the completion of the calculation step, the next step in the method as outlined herein is a recovery factor estimation step in which the variables determined in the calculation step are used in the estimation of the contribution of oil recovery factor for each of the sweep sub-zones. Specifically, the recovery factor estimation step first comprises calculating a foam zone recovery factor, being the oil recovery factor contributed from the foam sweep sub-zone. Also a water zone recovery factor is calculated, being the oil recovery factor contributed from the water sweep sub-zone, along with a gas zone recovery factor being the oil recovery factor contributed from the gas sweep sub-zone.

As in the case of the calculation step, in some iterations of the method of the present invention the reservoir and flooding parameters might be used in some of the calculations in the recovery factor estimation step as well. The optimization or execution of the calculations and estimations in that step using the reservoir and flooding parameters will again be understood to those skilled in the art and are contemplated within the scope hereof.

A calculation method for the total reservoir recovery factor is next selected based upon a comparison of the total sweep area and the total breakthrough area. Dependent upon which of those calculations is a higher result, the appropriate calculation method for the overall reservoir recovery factor is selected. Following the selection of the desired reservoir recovery factor calculation, that calculation can be executed.

If the total breakthrough area is less than the total sweep area, the sub-zone based recovery factor calculation which is selected might totalling the foam zone recovery factor, the water zone recovery factor and the gas zone recovery factor to yield the reservoir recovery factor. Alternatively if the total breakthrough area is more than the total sweep area this calculation could comprise, for each of the three sweep sub-zones:

1. calculating maximum area sweep efficiency;
2. calculating heterogenous sweep efficiency after breakthrough;
3. calculating area sweep efficiency after breakthrough and the heterogenous sweep efficiency after breakthrough;
4. calculating displacement efficiency; and
5. calculating a sub-zone recovery factor for the sub-zone in question using the displacement efficiency and the volumetric sweep efficiency corresponding to the sub-zone.

The calculated sub-zone recovery factors for all three sweep sub-zones would then in this case be totalled to yield the reservoir recovery factor.

Following the completion of the calculation of the reservoir recovery factor, the calculated reservoir recovery factor can be stored, and in extended embodiments of the method would be used to plot a complete graph of the calculated reservoir recovery factor on one axis of a graph for all of the flooding cycles within the flooding operation.

The method of the present invention can be used to determine the oil recovery factor with respect to a single flooding cycle or a flooding operation consisting of a single flooding cycle, or else the method could be used for the rendering of calculations of oil recovery factor within a hydrocarbon reservoir to be flooded in a flooding operation comprising a plurality of flooding cycles. It will be understood to those skilled in the art that either such approach could be accommodated within the context and confines of the claims outlined herein and on that basis.

The method of the present invention can be used to model oil oil recovery factor with respect to a flooding operation in a hydrocarbon reservoir that used any number of injection wells and any number of production wells.

The method of estimating oil recovery factor from a foam flooded reservoir of the present invention could be executed manually, or could in higher likelihood be executed in computer software form. The computer software approach could be achieved either using a purpose-built computer software program, a mathematical modeling software configured to execute the necessary calculations, or even a spreadsheet or similar approach. Any number of types of computer software approaches will be understood to those skilled in the art of software design and all such approaches are contemplated within the scope of the present invention.

The invention, a non-transitory computer-readable storage medium for use in the estimation of oil recovery factor in a foam flooded hydrocarbon reservoir, accomplishes its objectives comprising a computer-readable storage medium including instructions that when executed by a computer, cause the computer to define a reservoir sweep zone, being the volumetric area within a hydrocarbon reservoir between at least one injection well and at least one production well, wherein gas and liquid surfactant injected into the at least one injection well in at least one flooding cycle will sweep oil through the reservoir sweep zone towards the at least one production well for extraction therefrom.

Following definition of the reservoir sweep zone, the computer-readable storage medium would cause the computer to, in respect of each flooding cycle, determine reservoir and flooding parameters with respect to the reservoir sweep zone based on the current state of gas and liquid surfactant injection into the reservoir sweep zone and, using the reservoir and flooding parameters, subdividing the reservoir sweep zone into three sweep sub-zones, being a foam sweep sub-zone, a water sweep sub-zone and a gas sweep sub-zone.

The computer-readable storage medium would then cause the computer to, in a calculation step:
6. calculate a vertical sweep efficiency and a volumetric sweep efficiency within each of the sweep sub-zones;
7. calculate a total sweep area for the reservoir sweep zone, being the volumetric area of the reservoir sweep zone swept by foam at the moment of the current flooding cycle;
8. calculate a foam sweep area, being the volumetric area of the foam sweep sub-zone swept by foam at the moment of the current flooding cycle;
9. calculate a water sweep area, being the volumetric area of the water sweep sub-zone swept by water at the moment of the current flooding cycle;
10. calculate a gas sweep area, being the volumetric area of the gas sweep sub-zone swept by gas at the moment of the current flooding cycle;
11. calculate a foam breakthrough area, being the volumetric area of the foam sweep sub-zone being broken through by existing foam within the flooding cycle, which includes the foam sweep area and a foam bypass area therearound caused by the mobility difference between foam and oil;
12. calculate a water breakthrough area, being the volumetric area of the water sweep sub-zone being broken through by existing water within the flooding cycle, which includes the water sweep area and a water bypass area therearound caused by the mobility difference between water and oil; and
13. calculate a gas breakthrough area, being the volumetric area of the gas sweep sub-zone being broken through by existing gas within the flooding cycle, which includes the gas sweep area and a gas bypass area therearound caused by the mobility difference between gas and oil; and calculate a total breakthrough area, being the total of the foam breakthrough area, the water breakthrough area and the gas breakthrough area.

Following completion of the calculation step, computer-readable storage medium would then enable or instruct the computer to conduct a recovery factor estimation step comprising the steps of:
14. calculating a foam zone recovery factor, being the oil recovery factor contributed from the foam sweep sub-zone;
15. calculating a water zone recovery factor being the oil recovery factor contributed from the water sweep sub-zone;
16. calculating a gas zone recovery factor being the oil recovery factor contributed from the gas sweep sub-zone;
17. selecting a reservoir recovery factor calculation method to be used by comparison of the values of the total breakthrough area and the total sweep area; and
18. execute the selected reservoir recovery factor calculation.

The variations of the calculations and method executed by the computer-readable storage medium would be any modification reasonably inferred within the overall scope of the oil recovery factor estimation method outlined herein.

One of the significant benefits of the execution of the method of the present invention using computer software is that in embodiments of the method which incorporate the plotting of one or more graphs based on the calculated reservoir recovery factors, following the calculation of the reservoir recovery factor for the desired flooding cycles within a flooding operation, is that either purpose built software or many available modeling tools allow for reasonably straightforward graphic rendering of such a plot. Obviously the plotting of these graphs using computer software in accordance with the remainder of the method of the present invention is also contemplated within the scope hereof, regardless of the specific approach which was taken including rendering one or more graphs for a user interface or a printed report format using an integrated software tool along with the remainder of the calculations of the present invention, or else using a separate graphing tool mounted on top of the stored reservoir recovery data to render one or more graphs of this information.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
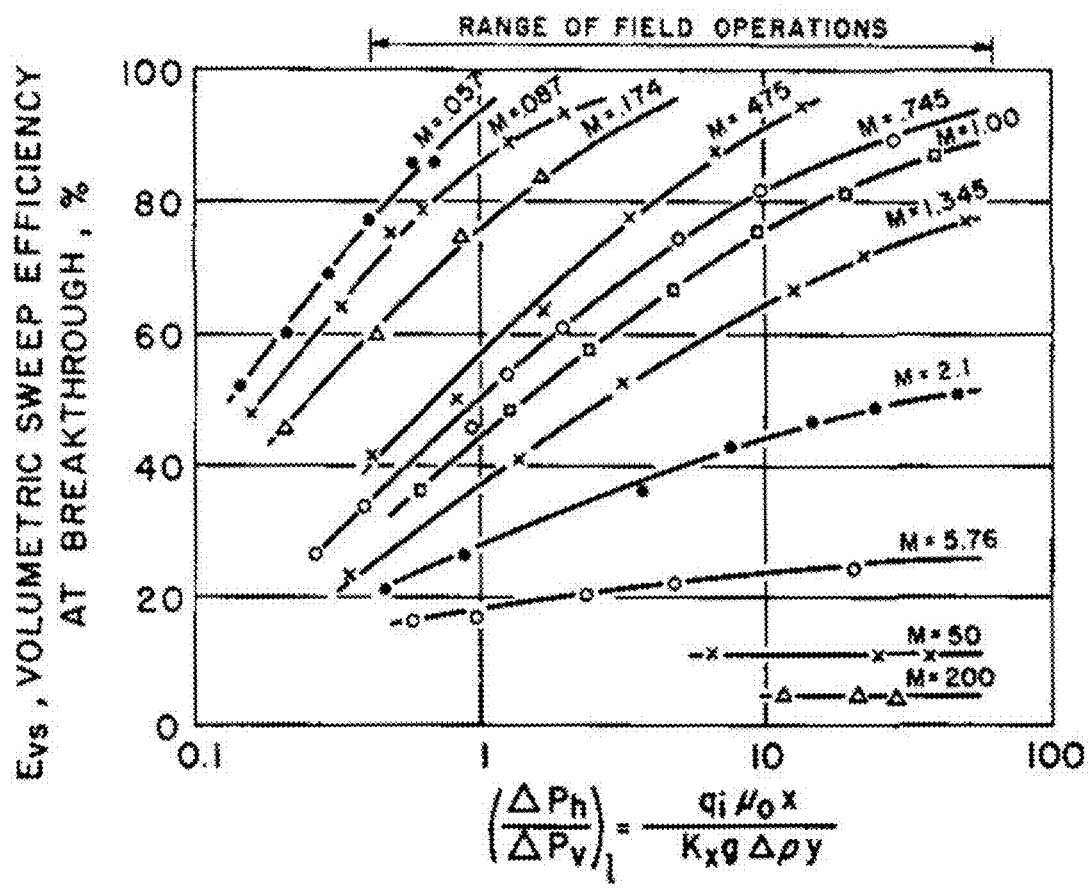
FIG. 1 is a graph demonstrating vertical sweep efficiency with varying reservoir and flooding parameters in accordance with one embodiment of the present invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

As described herein, the present invention comprises a novel method of estimating oil recovery factor from a foam flooded reservoir. The method comprises a number of steps as are outlined below in further detail, which allow for accurate and timely forecasting of oil recovery factors in foam flooding projects in hydrocarbon reservoirs.

Foam flooding is a technique which is used to enhance oil recovery in a hydrocarbon reservoir. Foam flooding typically consists of providing an injection well in the hydrocarbon reservoir into which stimulants for the reservoir can be injected, and which can sweep oil contained in the reservoir and the rock formation towards the production well from which that swept oil can be recovered. Typically a flooding operation consists of a series of flooding cycles, in which gas and/or a liquid surfactant will be injected into the injection well, to effectively sweep or push oil through the formation towards the production well.

The injection of gas and a surfactant fluid into the formation typically results in the creation of foam in the formation. Phone is generated by the mixing of injected liquid and gas together under an external pressure difference. In each flooding cycle in the flooding operation, a slug of a liquid surfactant such as water, brine or the like is injected which is followed by a slug of free gas. Because of the instability of fall, the gas in the liquid surfactant will eventually separate, cycles of gas and liquid surfactant are injected into the reservoir, and thus there will be phone, water and gas all existing in the reservoir at the same time. From the perspective of the general understanding of the prior art as well as the method of the present invention the injection of a single pairing of a slug of liquid surfactant and/or slug of free gas through the injection well into the formation or the reservoir is referred to as a single flooding cycle.

Either in advance of a flooding operation or during the flooding operation it is often desirable to calculate or model the likely oil recovery or hydrocarbon flushing from the hydrocarbon reservoir. Oil recovery from the reservoir, via the production well or wells, from a foam flooding operation typically provides enhanced results over hydrocarbon recovery from a reservoir not using foam flooding or stimulation—the method of estimating oil recovery factor from a foam flooded reservoir disclosed herein provides one method of modelling or calculating the likely oil recovery factor from the hydrocarbon reservoir based upon the application of foam flooding techniques thereto.

Typical measurement of productivity from a hydrocarbon reservoir in foam flooding applications and other enhanced oil recovery projects such as those outlined herein is measured by comparison of the oil recovery factor for the reservoir or some portion thereof. The oil recovery factor is the metric which is used to gauge comparative productivity of different enhanced all recovery measures or generally speaking the reservoir productivity. Enhancing the oil recovery factor measurement, by modeling or by certain recovery activities, generally speaking as an indicator of increased productivity from the hydrocarbon reservoir. As such it is desirable for hydrocarbon producers in these types of applications to come up with means of maximizing oil recovery factor in different applications, and in order to do this it is necessary to be able to model the oil recovery factor in different scenarios. The present invention is a method of estimating oil recovery factor from a foam flooded reservoir, that is to say provides a means of modeling oil recovery factor under different foam flooding conditions and over time, for the purpose of understanding and/or maximizing the productivity of a particular foam flooding project.

For the purpose of the method outlined herein, the area of the foam flooded reservoir which is subjected to the foam flooding and from which oil will be recovered is referred to as a reservoir sweep zone. The reservoir sleep zone is the area within the hydrocarbon reservoir between the injection well and the production well, into which injected gas and liquid surfactant will be injected in at least one flooding cycle in a flooding operation.

Figure 3:
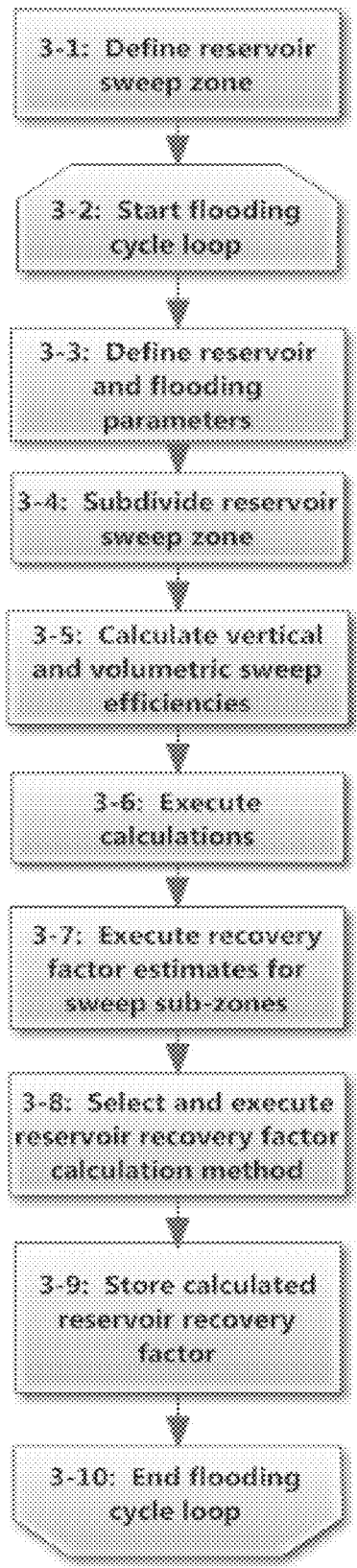
FIG. 3 is a flow chart demonstrating the steps in one embodiment of the method of estimating oil recovery factor from a foam flooded reservoir of the present invention.
Figure 4:
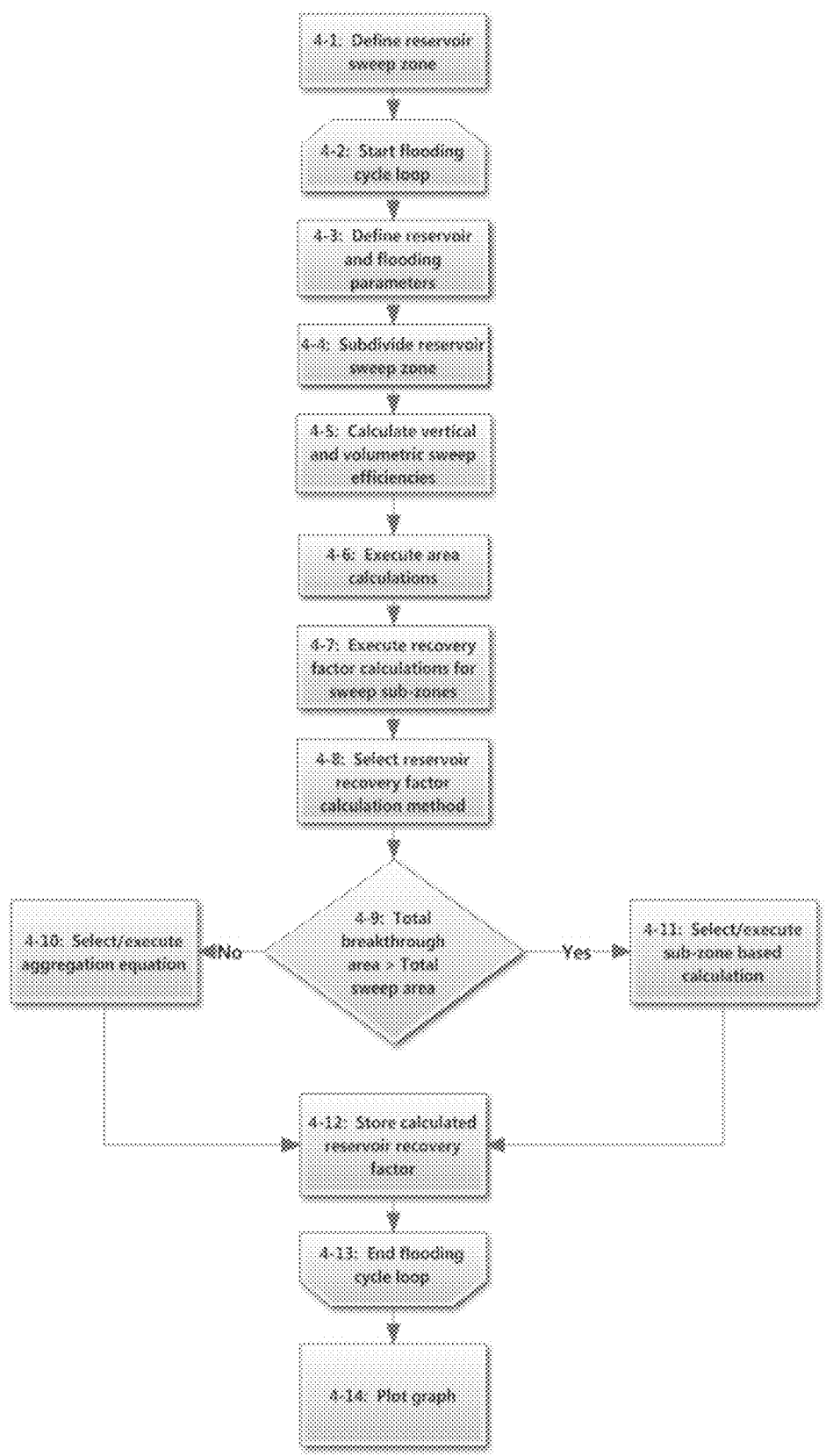
FIG. 4 is a flow chart demonstrating the steps in an alternate embodiment of the method of estimating oil recovery factor from a foam flooded reservoir of the present invention, including the step of plotting a graph using the reservoir recovery factor stored in respect of a plurality of flooding cycles.
Figure 5:
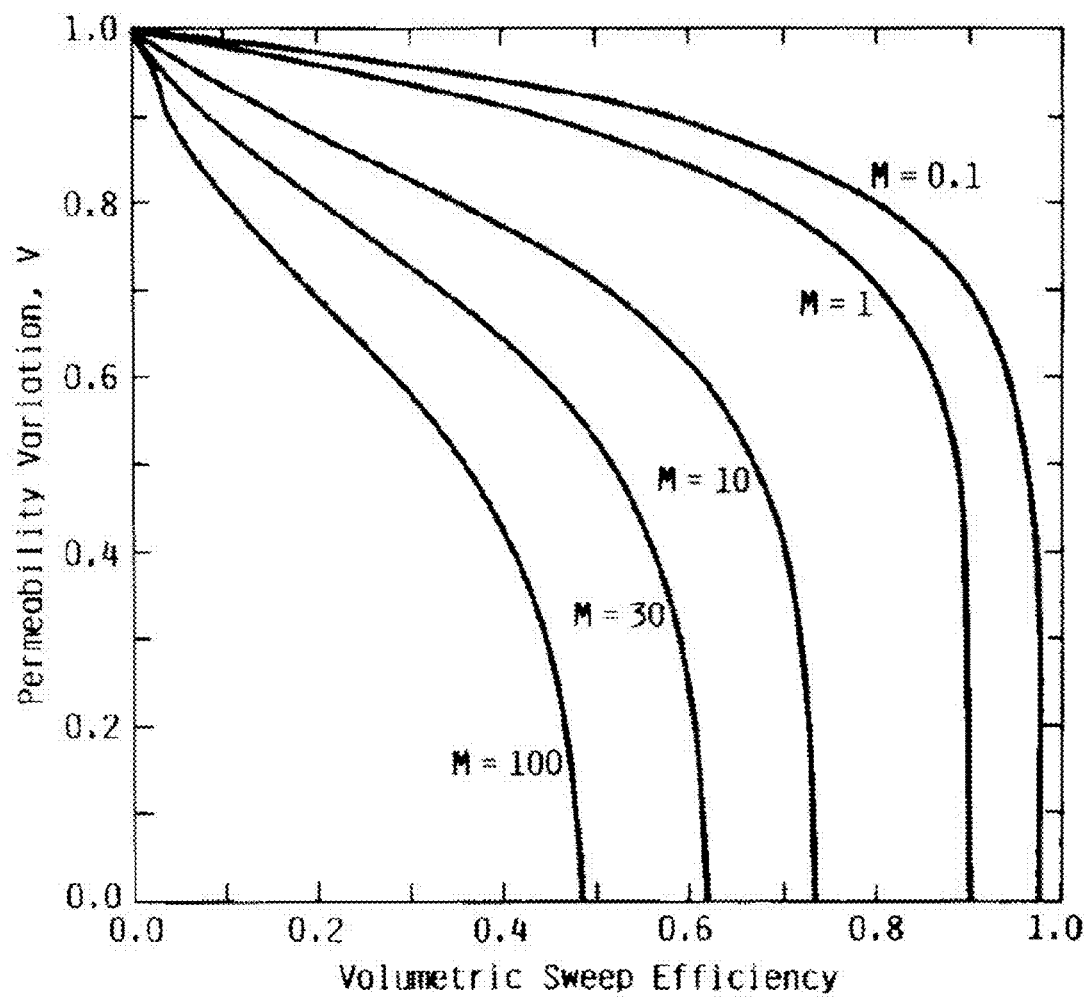
FIG. 5 is a graph demonstrating volumetric sweep efficiency with varying reservoir and flooding parameters in accordance with one embodiment of the present invention.
Figure 6:
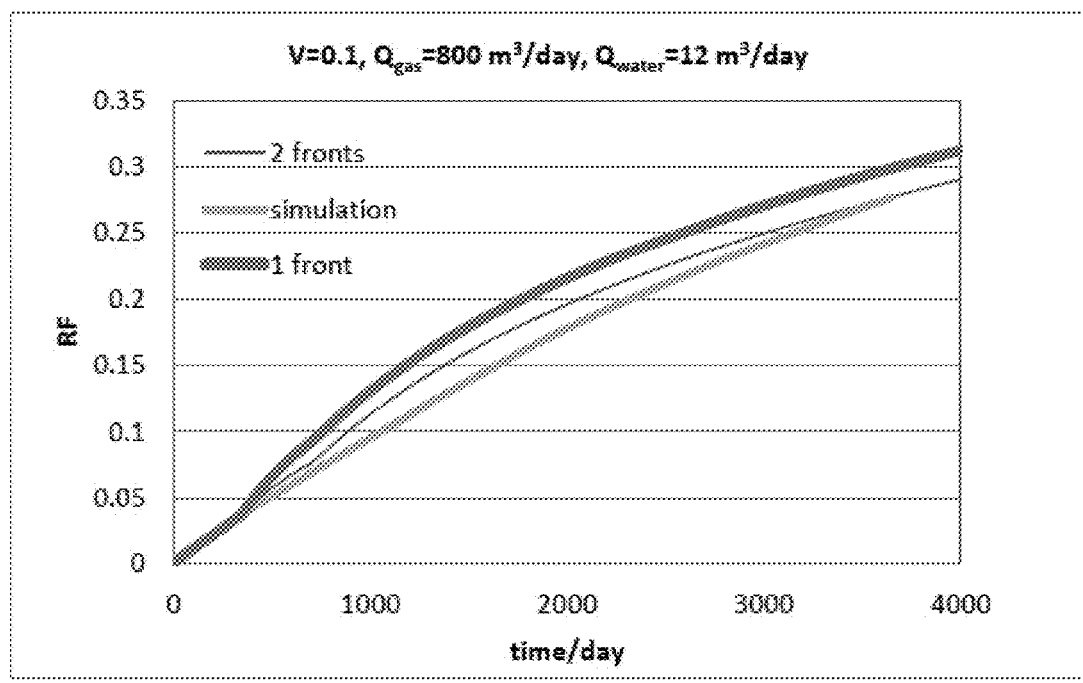
FIG. 6 is one plotted result of oil recovery factor estimation in accordance with the method of the present invention.
Figure 7:
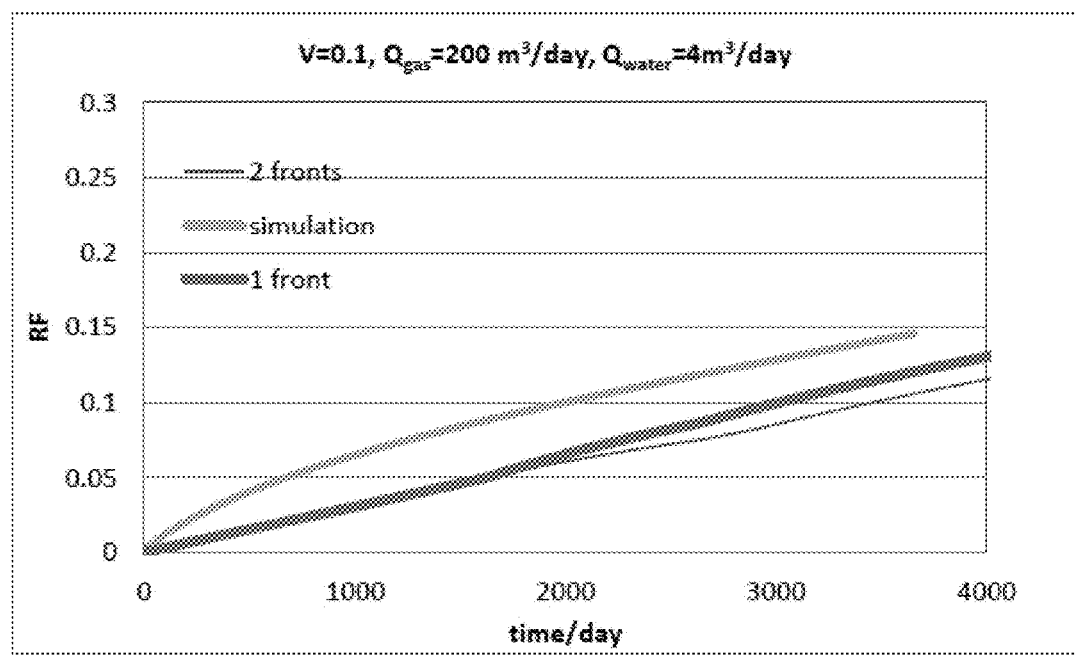
FIG. 7 is another plotted result of oil recovery factor estimation in accordance with the method of the present invention.
Figure 8:
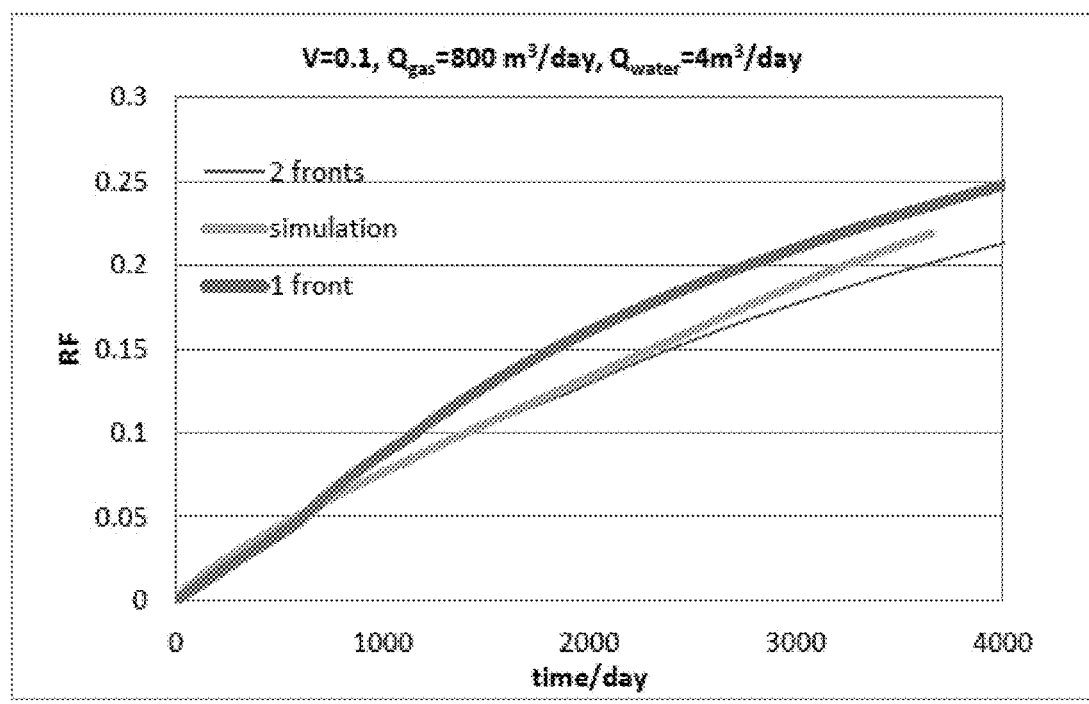
FIG. 8 is another plotted result of oil recovery factor estimation in accordance with the method of the present invention.
Figure 9:
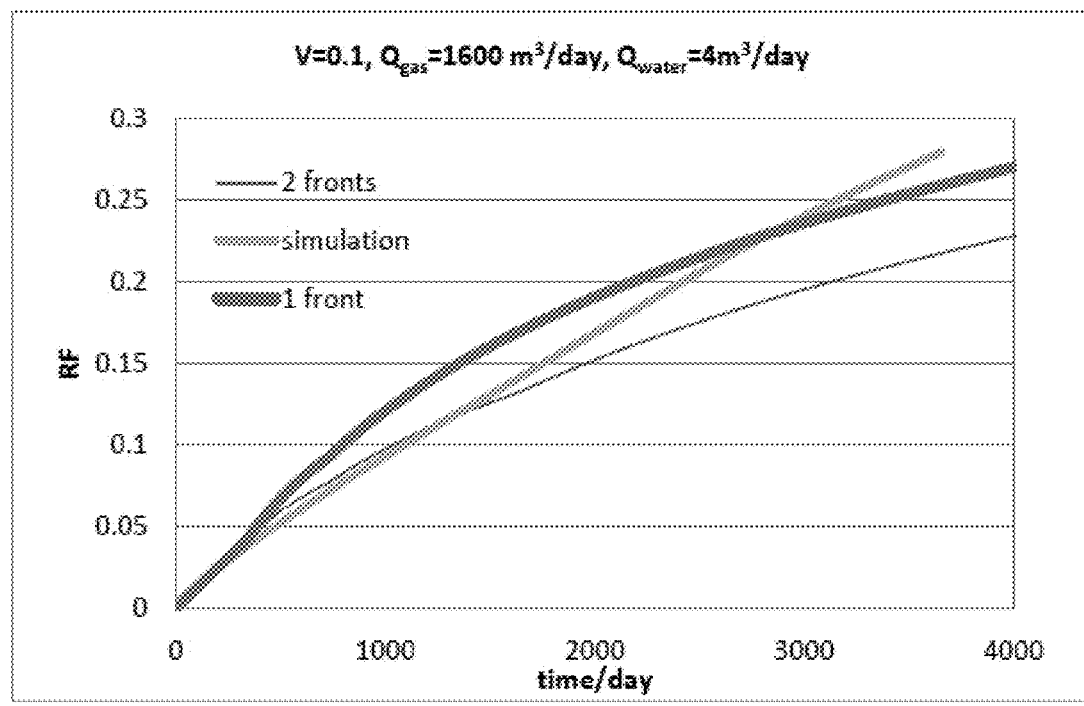
FIG. 9 is another plotted result of oil recovery factor estimation in accordance with the method of the present invention.
Figure 10:
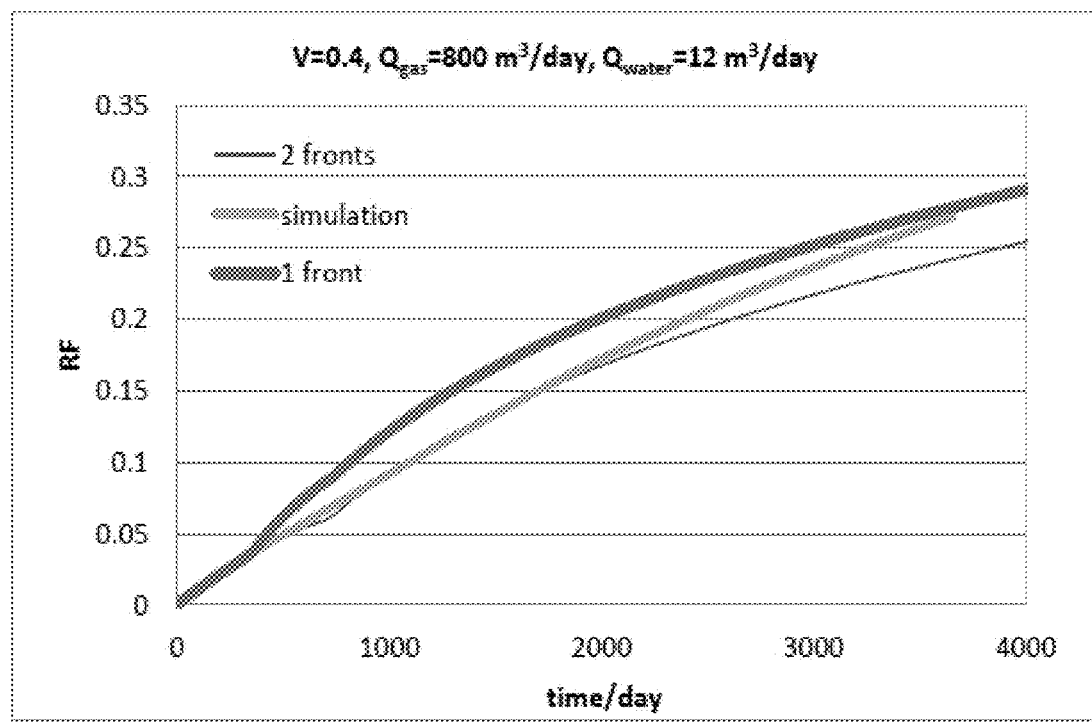
FIG. 10 is another plotted result of oil recovery factor estimation in accordance with the method of the present invention.
Figure 11:
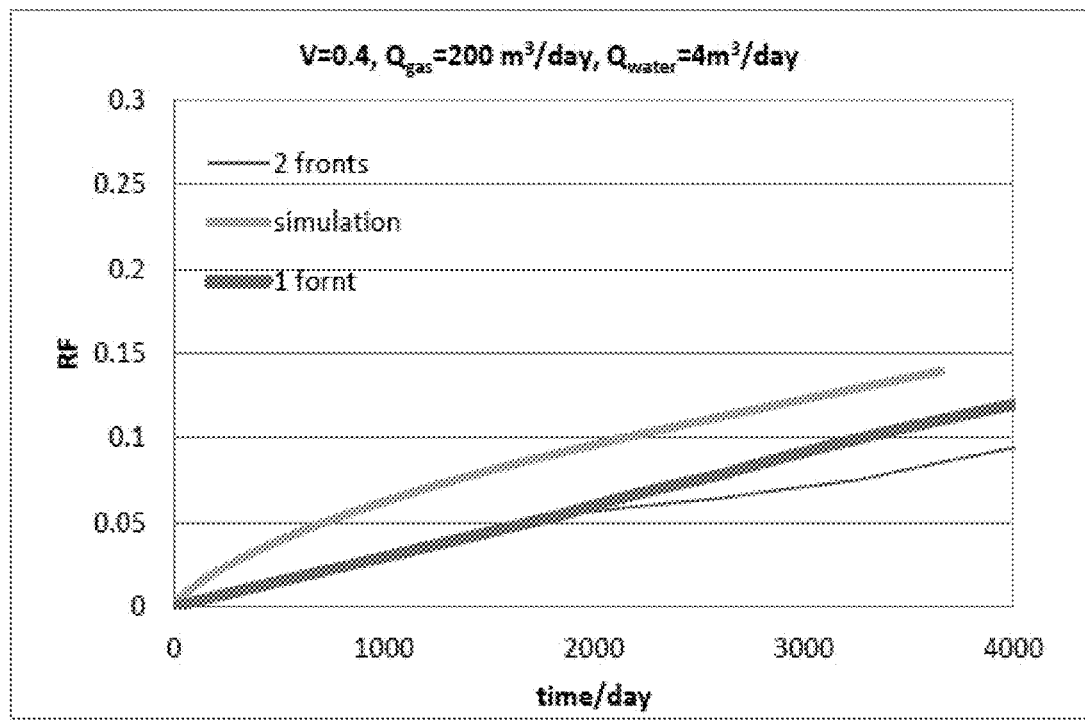
FIG. 11 is another plotted result of oil recovery factor estimation in accordance with the method of the present invention.
Figure 12:
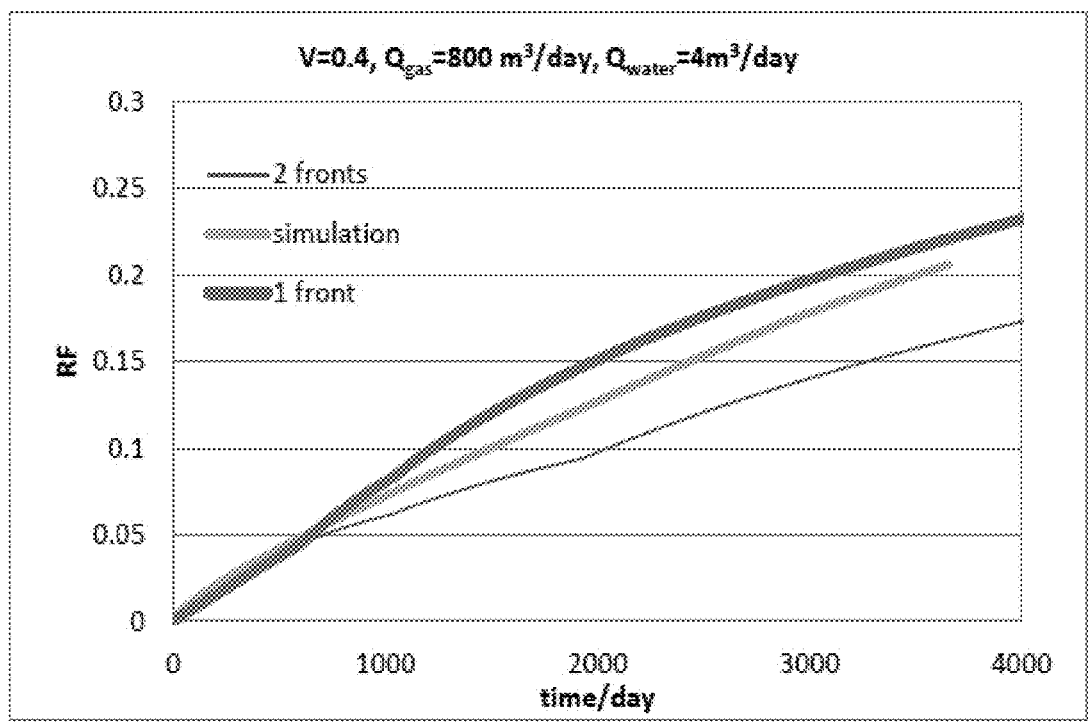
FIG. 12 is another plotted result of oil recovery factor estimation in accordance with the method of the present invention.
Figure 13:
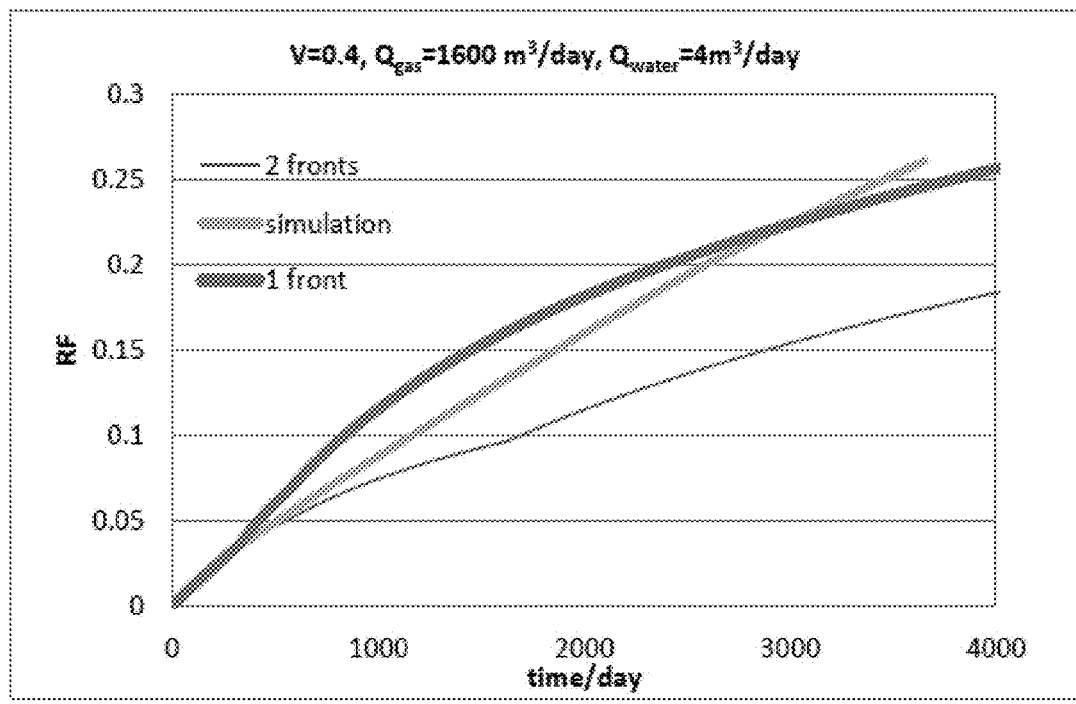
FIG. 13 is another plotted result of oil recovery factor estimation in accordance with the method of the present invention.
Figure 14:
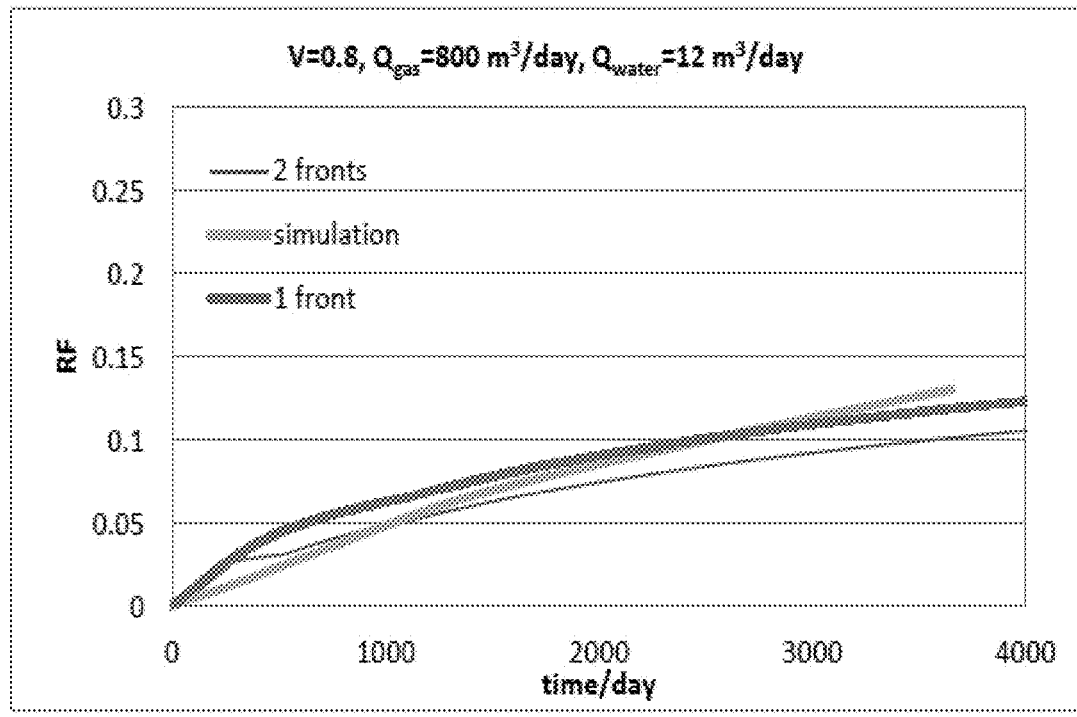
FIG. 14 is another plotted result of oil recovery factor estimation in accordance with the method of the present invention.
Figure 15:
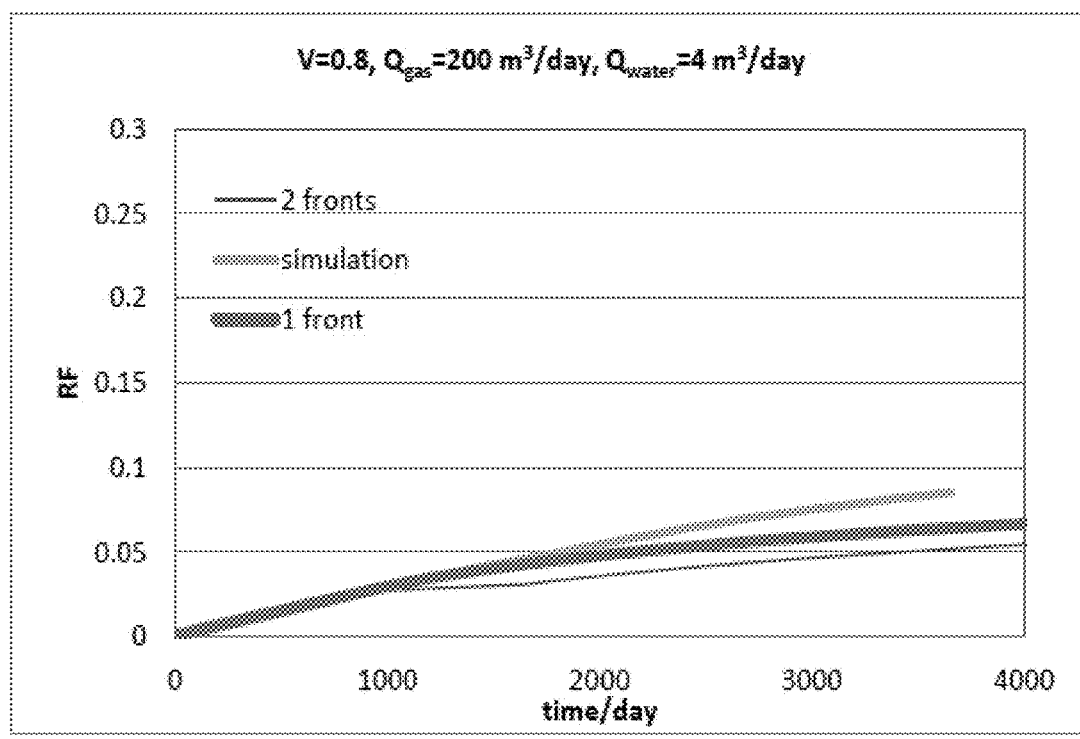
FIG. 15 is another plotted result of oil recovery factor estimation in accordance with the method of the present invention.
Figure 16:
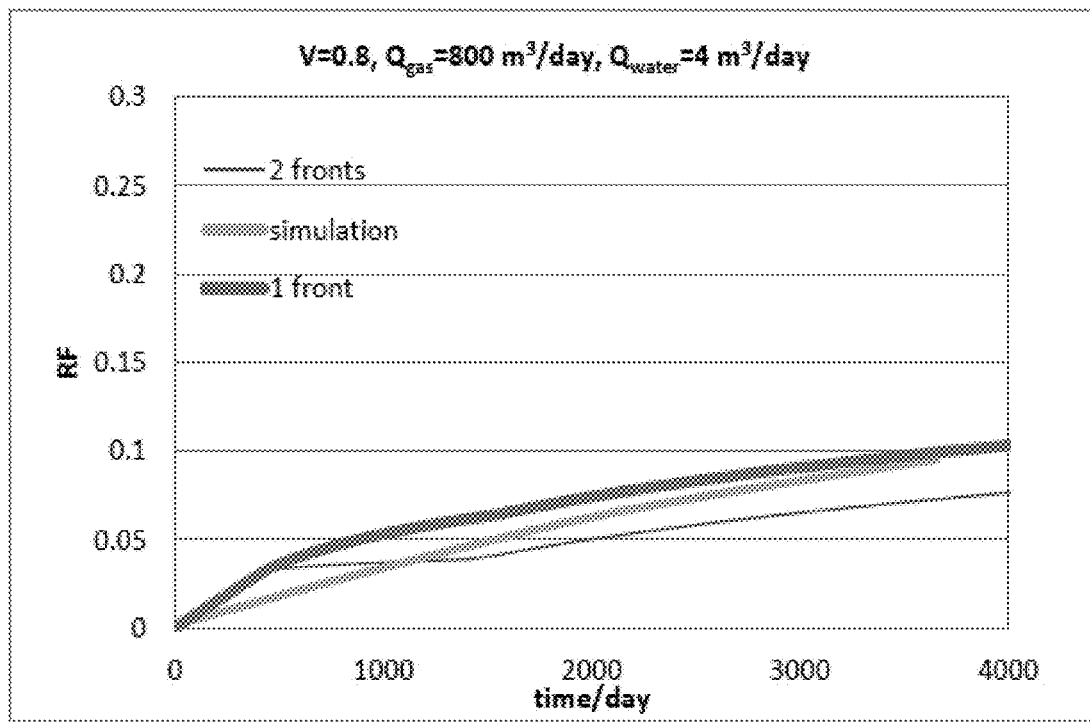
FIG. 16 is another plotted result of oil recovery factor estimation in accordance with the method of the present invention.
Figure 17:
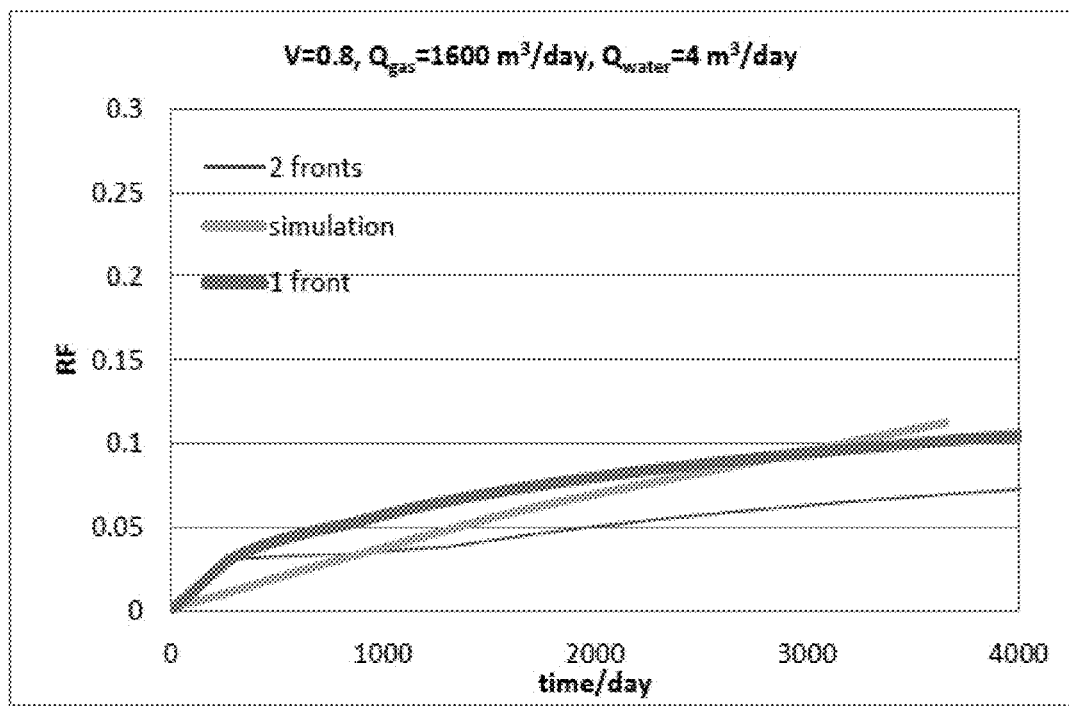
FIG. 17 is another plotted result of oil recovery factor estimation in accordance with the method of the present invention.

General Method Overview:

As outlined above, the invention comprises a method of estimating oil recovery factor from a foam flooded reservoir which can be practiced optimally in a computer software embodiment to render the calculations (although the method itself performed manually is also novel and is intended to be within the scope hereof as well). With reference to FIG. 3 and FIG. 4 we will now show a general overview of two embodiments of the method of the present invention, following which we will provide more detailed review and analysis of the modelling of certain sample data, demonstrating the utility of the present invention.

FIG. 3 is a flow chart demonstrating the steps of one embodiment of the method of the present invention. As outlined elsewhere herein, the method of the present invention could either be conducted manually or in a traditional paper-based format, or is more likely to be conducted as a software system particularly where there is a flooding operation comprised of a large plurality of flooding cycles. All such approaches are contemplated within the scope hereof.

Referring to FIG. 3, there is first shown at Step 3-1, the definition of the reservoir sweep zone. As outlined above, the reservoir sweep zone is the area within a hydrocarbon reservoir which extends between at least 1 injection well into which slugs of gas or liquid surfactant will be injected for the purpose of sweeping oil from the hydrocarbon reservoir, towards at least 1 production well in to which the combination of foam, gas, water or other liquid surfactant and oil will be recovered and extracted from the sweeping and flooding operation. Separation of that recovered liquid into oil and other constituent components is beyond the scope of the method of the present invention but will be understood by those skilled in the art to take place on the fluid recovered from such a zone flooding operation within a hydrocarbon reservoir.

The flooding operation itself compromises the injection of a plurality of slugs of gas and liquid surfactant such as water, brine or the like into the formation of the hydrocarbon reservoir through the at least one injection well. Each pair of gas and liquid slug injections is referred to as a flooding cycle. The entire flooding operation will typically consist of a plurality of flooding cycles, although it will be understood that the method of the present invention could be used to calculate oil recovery factor from the reservoir sweep zone for anywhere as little as a single flooding cycle, through to a flooding operation comprising many tens or even hundreds of flooding cycles. Again alteration or extension of the overall flooding operation and its impact on the math of the method of estimating oil recovery factor from a foam flooded reservoir of the present invention are all contemplated within the scope hereof.

Following the definition of the reservoir sweep zone, shown at Step 3-1, a series of calculations is executed with respect to the reservoir sweep zone and various reservoir and flooding parameters therein for each flooding cycle within the flooding operation. A flooding cycle loop is shown extending from Step 3-2 to Step 3-10 in FIG. 3. This is meant to signify that the flooding cycle loop of that flow chart will be conducted for each flooding cycle in respect of which it is desired to execute the oil recovery factor estimation method.

The first step within the flooding cycle loop 3-2 is the definition of reservoir and flooding parameters 3-3. Reservoir and flooding parameters, as outlined elsewhere herein, could include reservoir porosity, factors contributing to breakthrough between phases within the reservoir and other parameters for the flooding operation including for example volumes of gas or liquid surfactant injected within a particular slug or flooding cycle etc. The different types of reservoir and flooding parameters which might be used in the execution of the method of the present invention will be understood to those skilled in the art and are outlined herein, and all are contemplated within the scope of the present invention. The reservoir and flooding parameters might change by flooding cycle or might remain constant.

Following the definition of the reservoir and flooding parameters for the particular flooding cycle, the reservoir sweep zone will be subdivided into a plurality of sweep sub-zones, namely the foam sweep sub-zone, the gas sweep sub-zone and the water sweep sub-zone. The definition of these sweep sub-zones will be calculated or determined based upon the reservoir and flooding parameters understood, and the general state of the flooding operation within the reservoir. Effectively, the foam sweep sub-zone, the gas sweep sub-zone and the water sweep sub-zone will move through the formation of the reservoir sweep zone from the at least one injection well towards the at least one production well, within the flooding operation. The speed of movement, shape and size of the fronts of those sweep sub-zones will all be impacted by the various reservoir and flooding parameters and again the modeling of these sweep sub-zones is contemplated regardless of its specific method within the scope of the present invention.

Following the subdivision of the reservoir sweep zone into the three sweep sub-zones, the next step in the method, outlined at Step 3-5 is the calculation of vertical sweep efficiency and volumetric sweep efficiency with respect to each of the sweep sub-zones. The details of these calculations is outlined elsewhere herein. In addition to the calculation of the vertical sweep efficiency and volumetric sweep efficiency shown at Step 3-5, there is also shown the execution of additional calculations, at Step 3-6, which are necessary for the estimation of the recovery factor contribution of each of the sweep sub-zones to the overall reservoir recovery factor within a particular flooding operation or flooding cycle. There are specific models which are anticipated to be most useful for the purpose of estimating the recovery factor or recovery factor contribution within the overall reservoir, for each of the sweep sub-zones. This is shown at Step 3-7 following the calculation of each of these recovery factor estimates for the sweep sub-zones (being the foam zone recovery factor, the gas zone recovery factor and the water zone recovery factor), the overall reservoir recovery factor can be determined. This is shown at Step 3-8.

As is outlined in detail in the specification hereof, a particular calculation method needs to be selected for use in the determination of the reservoir recovery factor, as shown at Step 3-8. The calculation method which is selected will be determined based in large part upon the calculated breakthrough factor between various sweep sub-zones within the reservoir sweep zone. Following the selection of the appropriate reservoir recovery factor calculation method at 3-8, the calculation will be executed, yielding a calculated reservoir recovery factor. Finally, the calculated reservoir recovery factor can be stored, shown at Step 3-9, reaching the end of the flooding cycle loop shown at Step 3-10. The flooding cycle loop can then be conducted in respect of additional flooding cycles within the flooding operation, until the maximum number of flooding cycles for the particular flooding operation is reached—for each flooding cycle the increment of the flooding cycle in the method (the count) would be increased.

As outlined above, it is specifically contemplated that the method of the present invention could be executed using computer software. Various types of mathematical modeling software exist which could be customized or programmed for use to execute the calculation method of the present invention, or alternatively the method could be accomplished using a purpose built computer software, as outlined elsewhere herein.

Referring now to FIG. 4 there is shown an additional flow chart with an alternate embodiment with a bit more detail for the method of calculation of the present invention. Shown at the start of the method of FIG. 4, in Step 4-1, the reservoir sweep zone is again defined. Following the definition of the reservoir sweep zone, a flooding cycle loop, which in this case extends from Step 4-2 to Step 4-13, is initiated, indicating the conduct of the same set of calculations for each selected flooding cycle within a flooding operation. The first step within the flooding cycle loop 4-2 is the definition of reservoir and flooding parameters 4-3. Some of the reservoir and flooding parameters, as outlined above, will remain constant throughout the entire flooding operation and others will be changing on an ongoing basis and will be recalculated in respect to each flooding cycle. The reservoir and flooding parameters required for the execution of the method of the present invention are otherwise outlined herein and all reservoir and flooding parameters which can be used in this way are contemplated within the scope of the present invention.

Following the capture, definition or refinement of the reservoir and flooding parameters with respect to a particular flooding cycle in a flooding operation, the reservoir sweep zone will again be divided into 3 sweep sub-zones, being the foam sweep sub-zone, the water sweep sub-zone and the gas sweep sub-zone. Vertical sweep efficiency and volumetric sweep efficiency for each of the foam sweep sub-zone, the gas sweep sub-zone and the water sweep sub-zone are calculated, shown at Step 4-5, moving through to additional area calculation step 4-6 and recovery factor calculations for the individual sweep sub-zones within the reservoir sweep zone are shown at Step 4-7.

Shown at Step 4-8 is again the indication of the selection of the reservoir recovery factor calculation method—in more detail, shown with decision block 4-9, the reservoir recovery factor calculation method might be determined in an embodiment such as shown in this Figure by comparing total breakthrough area of the combined sweep sub-zones to the total sweep area of the reservoir sweep zone. If the breakthrough area exceeds the total sweep area, then Step 4-11 shows the selection and execution of a calculation method for the reservoir recovery factor which is based upon individual sweep sub-zone based calculations. Alternatively, if the total breakthrough area does not exceed the total sweep area, a more basic aggregation equation simply adding up the foam zone recovery factor, the gas zone recovery factor and the water zone recovery factor could be used. Following the execution of either of the recovery factor calculation methods or calculations, the calculated reservoir recovery factor can be stored, shown at Step 4-2. This indicates the end of the flooding cycle loop and that entire loop is conducted in respect of each selected flooding cycle within the flooding operation. The flooding cycle loop can then be conducted in respect of additional flooding cycles within the flooding operation, until the maximum number of flooding cycles for the particular flooding operation is reached—for each flooding cycle the increment of the flooding cycle in the method (the count) would be increased.

Also shown in the method of FIG. 4 is the plotting of a graph, at Step 4-14, based upon the stored calculated reservoir recovery factors. Effectively, the calculated reservoir recovery factor for each flooding cycle could be used on one axis of a graph and plotted against either time or other reservoir and flooding parameters etc. to provide varying degrees and types of analytical tools for use in modeling, executing and understanding of a particular flooding operation. The specific types of graphs which could be created, shown at step 4-14, will be understood to vary. Any type of graph of this nature is contemplated within the scope hereof, including those shown in FIG. 6 through FIG. 17.

Sweep Efficiency and Behaviour of Oil and Foam within the Reservoir:

In a flooding operation which involves the injection of a liquid surfactant and free gas into a hydrocarbon reservoir, it is assumed that the gas, the liquid surfactant, as well as foam created by the external pressure application to the gas and the liquid surfactant within the formation, will all three exist in the formation at the same time. Because of their significant difference in mobility, it is assumed that there would be three sweep sub-zones of injected fluid inside reservoir, including a foam sweep sub-zone, a water sweep sub-zone and a gas sweep sub-zone. By assuming there is no superposition between them, the sum of the area of all three sweep sub-zones is regarded as the total sweep area of the reservoir sweep zone. Because of the increment of mobility from foam, liquid to gas, the sequence of the three sweep sub-zones from injection well to production well is the foam sweep sub-zone, the water sweep sub-zone and the gas sweep sub-zone—the gas front is going to reach the production well earlier than water or liquid surfactant, both of which are generated from collapse of foam. If every complete foam slug, including one water slug and one gas slug, is considered as a flooding cycle, the number of flooding cycles could be calculated when the gas or water front reaches the production well. Once a working scheme of foam flooding is decided, specific breakthrough time could be estimated according to the water or gas slug size.

The key to the method of the present invention and modeling appropriately the oil recovery factor within a hydrocarbon reservoir which is to be subjected to a flooding operation is understanding the concept of sweep efficiency within the geology of the formation. Injection of gas and fluid into the formation, which form foam, result as they move through the formation towards a production site in the sweeping or pushing oil from the formation towards the production site.

Before the gas front reaches the production well, it is assumed that cumulative production is in linear relation to cumulative time and cumulative injection volume. The swept area during this period of time is calculated as 1:1 to total injected volume of fluid. Following the breakthrough of gas, sweep efficiency is calculated with a modified equation outpost breakthrough heterogenous sleep efficiency until the waterfront reaches the production well. Following the water from reaching the production well sleep efficiency is then calculated with the other equation used for liquid—theoretical maximum sleep efficiency is introduced to set up a limitation of curve after breakthrough.

In order to determine the effect on sweep efficiency and how that changes with time or injection volume related to one or more flooding cycles, the breakthrough time and the theoretical maximum sleep efficiency within each of the three sweep sub-zones are essential variables. Because of the assumption of the three sweep sub-zones, and the instability of foam, the displacement front of gas and water would reduce the production well before the foam within the formation. Two more critical points in the plotting of efficiency changing with time or injected volume include the breakthrough time for the gas front in the breakthrough time for the waterfront. A graph plotting all of these characteristics is divided into three parts by these two critical points. The part before the breakthrough of any injection fluid looks like a slash. It would turn into a curve once the gas front reaches the production well. After a while the slope of the curve would increase dramatically, once the waterfront reaches the production well. FIG. 1 is a sample plot of these characteristics in accordance within one embodiment of the present invention.

Defining Key Areas within the Reservoir:

As outlined above, foam flooding of a hydrocarbon reservoir physically involves the creation or use of at least one injection well and at least one production well. The at least one injection well is used to inject free gas and liquid surfactant into the formation of the hydrocarbon reservoir and is placed geologically in the appropriate position that the injected free gas and liquid surfactant will move through the geological formation of the hydrocarbon reservoir towards the at least one production well, sweeping or pushing oil from the formation towards the production well at which location that can be recovered. Most of the modeling and embodiments considered herein are based upon a mathematical model of only one injection well and one production well, for the purpose of modeling sleep efficiency and other variables. However, it will be understood by those skilled in the art of hydrocarbon reservoir modeling and enhanced oil recovery techniques such as those outlined herein that other embodiments involving more than one injection well and/or more than one production well could be conceived and modeled in accordance with the remainder of the method of the present invention without departing from the scope herof. All such approaches are contemplated within the scope of the present invention. Understanding of the concepts of injection wells, production wells in the definition of the geology and placement of injection production sites in a foam flooding project will be understood to those in this industry.

In addition to generally speaking understanding the concept of injection sites and production sites in the context of foam flooding of a hydrocarbon reservoir, one of the first steps of the method of the present invention, and in general in terms of modeling while recovery factor in models and methods such as outlined herein is the definition of a reservoir sweep zone. The reservoir sweep zone is the volume or area of the hydrocarbon reservoir between the at least one injection well and the at least one production well into which injected gas and liquid surfactant will be injected in at least one flooding cycle in a flooding operation. Effectively, the reservoir sweep zone is the area of the hydrocarbon reservoir from which it is desired to sweep oil using the foam flooding technique. The concept of defining a reservoir sweep zone will be understood to those skilled in the art of enhanced oil recovery techniques, since this same type of a concept of defining the desired sweep area for a flooding project is one of the first framing exercises are parameters which would be established in terms of modeling a particular flooding project. The reservoir sweep zone is defined to a degree by the selection of locations for the at least one injection well and the at least one production well, and again this will be understood by those skilled in the art of enhanced oil recovery techniques in terms of designing the appropriate scope of a particular flooding project.

Within the hydrocarbon reservoir and within the reservoir sweep zone, one of the precursor steps of the calculation or modeling of oil recovery factor in the reservoir sweep zone of a hydrocarbon reservoir is the determination of the division of the reservoir sweep zone into three sweep sub-zones within the reservoir sweep zone. By dividing the reservoir sweep zone into a foam sweep sub-zone, a water sweep sub-zone and a gas sweep sub-zone, within each one of which independent sweep efficiency and other variable calculations can be completed, it is believed that the accuracy and the speed of the method of the present invention can represent a significant enhancement over prior art methods. The definition of the sweep sub-zones within the reservoir sweep zone would be informed by an understanding of the reservoir and flooding parameters associated with the reservoir sweep zone. Those skilled in the art of hydrocarbon geology would again understand different approaches which could be taken to the specific definition of the sweep sub-zones, although it will generally speaking be understood that the definition of those regions within the reservoir sweep zone would be informed by an understanding of the behavior of gas, fluid and foam constituents within the reservoir, and how they will behave within the particular geology and the like in sweeping oil to the production well.

To enhance the accuracy of the modeling in the present method, based upon an understanding of the breakthrough of foam, water and gas between adjacent sweep sub-zones within the reservoir sweep zone, certain embodiments of the method of the present invention might further alter the calculations of oil recovery factor and sweep efficiency within the formation by incorporating a foam breakthrough area, water breakthrough area and a gas breakthrough area within which the behaviour and localized oil recovery factors might be further modified or refined.

Figure 2:
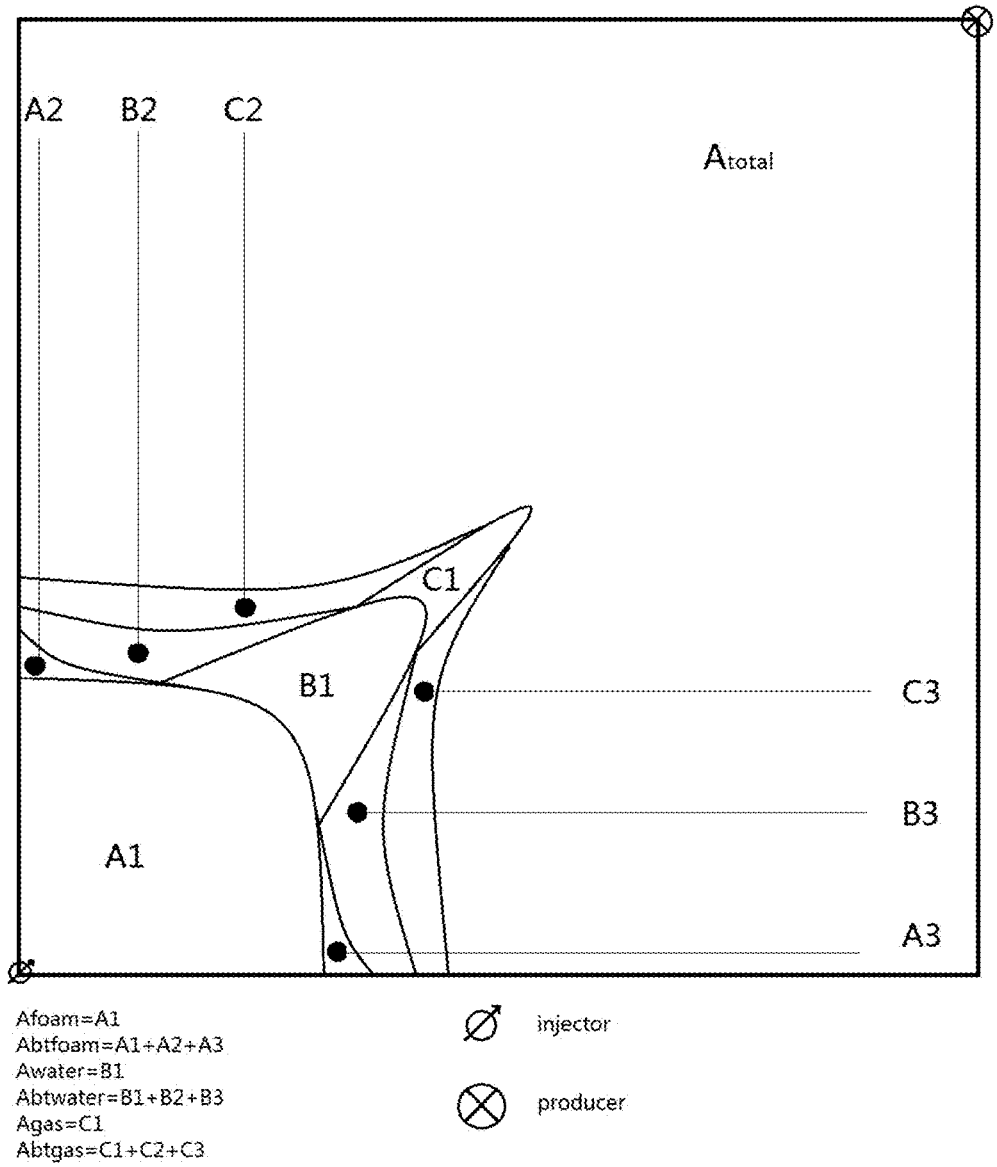
FIG. 2 shows one example of a total sweep area in a hydrocarbon reservoir against which the oil recovery factor estimation model of the present invention can be described.

FIG. 2 shows one embodiment of a reservoir sweep zone in accordance with the present invention, and describes the distribution of the three sweep sub-zones therein. Assuming that the three sweep sub-zones zones have relative clear interfaces because of their difference in mobility, $A_{foam}$, $A_{water}$ and $A_{gas}$ in the figure indicate the foam sweep sub-zone, the water sweep sub-zone and the gas sweep sub-zone, whereas surrounding regions $A_{btfoam}$, $A_{btwater}$ and $A_{btgas}$ indicate the foam breakthrough area, the water breakthrough area and the gas breakthrough area representing how much of the total sweep area can be broken through by foam, water and gas in a particular flooding cycle.

Although it is unnecessary to assume a region $A_{btfoam}$, in cases with extreme low mobility, foam may break through a certain area, which almost equals to $A_{foam}$. This potential mechanism is considered in order to make the whole calculation process more uniform. Further simplification showed in FIG. 3 is used for stressing out how the whole process is divided into three periods. For instance, while figuring out the area swept by water, calculation counts from the region right outside $A_{btfoam}$, because water in front of foam won't sweep the region just being broken through by foam. This method is used to calculate swept area and breakthrough area of each zone.

FIG. 2 also shows the location of an injection well and a production well, to provide a further conception of the volumetric area of the reservoir sweep zone and the overall operation of the method of estimating oil recovery factor from a foam flooded reservoir outlined herein.

The remainder of this specification shows numerous iterations of the oil recovery factor modeling method of the present invention, executed under different parameters, and an understanding of the definition of the sweep sub-zones and the breakthrough areas shown in FIG. 2 is considered important to the following description.

Key Assumptions:

Foam is generated by mixing injected liquid surfactant and gas together under external pressure difference. Each injection of gas and liquid surfactant into a reservoir comprises a flooding cycle. For each flooding cycle, a slug of surfactant solution is injected which is followed by a slug of free gas. Because of the instability of foam, gas and the liquid surfactant will separate eventually. Cycles of gas and liquid surfactant are injected into the hydrocarbon reservoir, causing foam, water and gas existing at the same time. Because of their significant differences in mobility, it is assumed that there would be three sweep sub-zones of injected fluid inside the hydrocarbon reservoir including a foam sweep sub-zone, a water sweep sub-zone and a gas sweep sub-zone. By assuming there is no superposition between them, the sum of all three sweep sub-zones is regarded as the reservoir sweep zone.

The following are key assumptions used in the modeling embodiments and examples shown herein:

Foam is generated in situ after a slug injection of surfactant followed by another slug injection of free gas;

Foam collapses as time passes, described by a half-life period;

Foam does not regenerate once it collapses;

Time is the only factor deciding the volume of remaining foam. The effect of contacting oil weakening foam strength is not considered;

Foam, free gas and water (liquid surfactant) have relatively obvious difference in mobility;

Fluid with higher mobility heads to the front of injected fluid, and it won't go to area that has already been swept through by fluid with lower mobility;

Two circumstances of breakthrough are considered, and one of them is a two-front case. Because of mobility differences, breakthrough time of gas and water is estimated individually. The first front is caused by gas channeling. The second front is caused by mobility difference between gas and water (liquid surfactant), which can bring a small quantity of production increase because water flooding has higher sweep efficiency. The other circumstance is single-front case which is derived from traditional water flooding case;

It will be understood to those skilled in the art that the invention could also be practiced with modification to these assumptions and all such alterations to the assumptions modeled which do not depart from the scope intended are considered by the inventors to be within the scope of the present invention.

Nomenclature:

The following nomenclature is used in the formulae outlined herein, and is provided for reference purposes in the demonstration of illustrated embodiments and the concepts and measurements or values represented in the various calculations outlined herein:

$A_{btfoam}$=foam breakthrough area: area being broken through by existing foam, m²

$A_{btgas}$=gas breakthrough area: area being broken through by existing gas, m²

$A_{btwater}$=water breakthrough area: area being broken through by existing water, or liquid surfactant, m²

$A_{foam}$=foam sweep area, m²

$A_{gas}$=gas sweep area, m²

$A_{water}$=water sweep area, m²

$C_{gasinfoam}$=gas volume factor, the ratio gas volume being captured inside foam to the volume of same mole of gas outside the foam $E_{AafterBT}$=areal sweep efficiency after breakthrough $E_{ABT}$=areal sweep efficiency at breakthrough for specific mobility ratio $E_{Afoam}$=areal sweep efficiency of foam $E_{Agas}$=areal gas sweep efficiency of gas $E_{Amax}$=theoretical maximum sweep efficiency with specific mobility ratio and permeability variation $E_{Awater}$=areal sweep efficiency of water $E_{Dfoam}$=displacement efficiency $E_{Dgas}$=displacement efficiency of gas $E_{Dwater}$=displacement efficiency of water $E_{Vfoam}$=volumetric sweep efficiency of foam $E_{Vgas}$=volumetric sweep efficiency of gas $E_{Vwater}$=volumetric sweep efficiency of water $E_{Zfoam}$=vertical sweep efficiency of foam $E_{Zgas}$=vertical sweep efficiency of gas $E_{Zwater}$=vertical sweep efficiency of water $f_w$=water cut h=reservoir height, m M=mobility ratio M*=pseudo mobility ratio PV=pore volume injected RF=reservoir recovery factor $RF_{foam}$=foam zone recovery factor $RF_{gas}$=gas zone recovery factor $RF_{water}$=water zone recovery factor $S_{oi}$=initial oil saturation $S_{or}$=residual oil saturation $S_{wc}$=connate water saturation T=half-life period, the time that existing amount of foam takes to decrease into half, h t=elapsed time after the specific cycle of foam generated, h $u_f$=velocity of injected fluid inside reservoir, m/day $u_{gas}$=gas injection rate (SC), m³/D $u_{water}$=liquid surfactant injection rate (SC), m³/D $V_{foam}$=pore volume swept by foam, m³

$V_{gas}$=pore volume swept by gas, m³

$V_{water}$=pore volume swept by water, m³

V=permeability variation $V_i$=volume of newly formed foam after a cycle of injection, m³

$V_{left}$ remaining volume of foam generated from a cycle of injected fluid after time t, m³

$V_{totalfoam}$=total amount of remaining foam, m³

$W_{inj}$=total volume (SC) of fluid having been injected, m³

$W_{iBT}$=total volume (SC) of fluid having been injected when breakthrough happens, m³

$\mu_o$=oil viscosity, cp $\mu_w$=water viscosity, cp $\varphi$=porosity

Details of Method Calculations:

We will now demonstrate the mathematical approach used in certain embodiments of the method of estimating oil recovery factor from a foam flooded reservoir outlined herein, for the purpose of outlining in further detail. The following calculations which are shown to demonstrate some of the embodiments of the mathematical models used in accordance with the overarching method of the present invention will be understood to be capable of modification to either refine or optimize their results, or by changing certain parameters or conditions therein to produce specific results within the general intended scope of the present invention, and all such changes as will be understood to those skilled in the art are contemplated within the scope of the present invention.

Total Breakthrough Area:

The first set of calculations which will be undertaken in iterations of the flooding cycle loop for a particular flooding cycle are calculations related to the total sweep area and total breakthrough area, which require the calculation of water breakthrough area, gas breakthrough area and foam breakthrough area. The breakthrough time for breakthrough of foam, water and gas between their corresponding sweep areas in the reservoir sweep zone is a relevant calculation. Gas has higher mobility than water, and water has higher mobility than oil. The gas sweep area is further from the at least one injection well than the water sweep area, and the water sweep area is further from the injection well than the foam sweep area. Because of this extraordinary difference in mobility ratio, gas will reach the at least one production well before water/surfactant and foam. The following formula, using the nomenclature outlined above, shows the condition under which gas breaks through to the at least one production well:

$$A_{BTfoam} + A_{BTwater} + A_{BTgas} = A_{total} \quad (1)$$

$A_{total}$ is the total sweep area, which is specified at the beginning of the calculation by data input or otherwise. According to FIG. 2, once this equation is reached, which means the summation of $A_{BTfoam}$, $A_{BTwater}$, and $A_{BTgas}$ reaches $A_{total}$, meaning no more new area for gas to sweep, the gas front reached producer. Where, $A_{BTfoam}$, $A_{BTwater}$, and $A_{BTgas}$ can be calculated based on the following equation:

$$A_{BTfoam} = \frac{A_{foam}}{E_{ABTfoam}} = \frac{A_{foam}}{C\sqrt{\frac{1+M^*_{foam}}{2M^*_{foam}}}} \quad (2)$$

$$A_{BTwater} = \frac{A_{water}}{E_{ABTwater}} = \frac{A_{water}}{C\sqrt{\frac{1+M^*_{water}}{2M^*_{water}}}} \quad (3)$$

$$A_{BTgas} = \frac{A_{gas}}{E_{ABTgas}} = \frac{A_{gas}}{C\sqrt{\frac{1+M^*_{gas}}{2M^*_{gas}}}} \quad (4)$$

In a five-spot working scheme, C=0.718. If the working scheme is invert nine-spot, C=0.525, and in an invert seven-spot working scheme, C=0.743. M* is the pseudo mobility ratio, which is a modified mobility ratio for heterogeneous case. It is determined by mobility ratio (M) and permeability variation (V). When V<0.7, $$M^* = e^{(-9.417lnM+32.8455)*V^3+(21.1818lnM-32.483)*V^2+(-3.5114lnM+9.2636)*V+lnM} \quad (5)$$

When V>0.7, $$M^* = \sqrt{(1.5556M^2 - 64.5597M + 472.5926)V^2 + (-2.5638M^2 + 105.2222M - 693.3333)V + M^2 - 40.3992M + 20.1996^2} + 20.1996 \quad (6)$$

M stands for mobility ratio in a homogeneous case, and V is permeability variation. $A_{foam}$, $A_{water}$ and $A_{gas}$ are calculated by equation (11), (17), and (22). $M^*_{foam}$ is the pseudo mobility ratio of foam to oil; $M^*_{water}$ is the pseudo mobility ratio of water to oil; and $M^{*gas}$ is the pseudo mobility ratio of gas to oil.

Breakthrough Time in the Water Sweep Sub-Zone:

Breakthrough of water into the gas sweep sub-zone will take place later than the breakthrough of gas. Specifically the breakthrough within the water sweep sub-zone will take place when the following equation is satisfied:

$$A_{BTfoam} + A_{BTwater} = A_{total} \quad (7)$$

$A_{total}$ is the total reservoir pattern area. Referring to FIG. 2, once this equation is reached, which means the summation of $A_{BTfoam}$ and $A_{BTwater}$ reaches $A_{total}$, indicating no more new area for water to sweep, the water front reaches the at least one production well.

Estimate of Recovery Factor Before Breakthrough

If the summation of $A_{BTfoam}$, $A_{BTwater}$, and $A_{BTgas}$ is less than $A_{toaal}$, the system is considered to be not broken through yet. The following are the next calculations used in the assessment of the oil recovery factor.

Foam Sweep Area:

Since the free gas and liquid surfactant are injected into the hydrocarbon reservoir by slug, it is assumed that the volume of generated fall within the reservoir sweep area equals the sum of injected gas and injected surfactant liquid under reservoir pressure. Considering not all of the gas injected into the reservoir forms foam with the surfactant agent successfully, a coefficient R is introduced to describe the situation when gas is over-injected. R is the ratio of gas forming foam to the total amount of gas injected in the same slug. In the calculation, R is considered as a constant coefficient. The gas, which is injected without generating foam, is assumed to be mixed with gas from collapse of broken foam. Both of them are going to combine together and form a gas channeling front, which is also the gas sweep sub-zone mentioned before. Gas inside the foam is compressed, in comparison to free gas in the same molar weight. In respect of the ideal gas:

$$P_{bubble}V = nRT$$

Meanwhile, gas pressure in every single bubble has the relationship with gas pressure outside the bubble as follows:

$$P_{bubble} = P_{freegas} + \frac{4\gamma}{R}$$

$\gamma$ is the surface tension of bubble. Although surfactant reduces surface tension at the beginning, expansion of surface will lower concentration of surfactant on the surface eventually, which makes $\gamma$ increase. Then, $P_{bubble}$ increases and bubble is compressed.

The other new coefficient gas volume factor in foam $C_{gasinfoam}$ is introduced to describe the ratio gas volume being captured inside foam to the volume of same mole of gas outside the foam, which is just a little less than 1. This coefficient is introduced to describe the existence of foam more accurately. Comparing with other kind of injected fluid except from its extraordinary profile control performance, instability of foam is also a remarkable feature of foam. Half-life period of foam is introduced to calculate the remaining volume of foam in the reservoir.

$$V_{left} = V_i \times \exp\left(-\frac{\ln 2}{T}t\right) \quad (8)$$

$V_{left}$ is the remaining volume of foam generated from a cycle of injected fluid after time t. $V_i$ is volume of newly formed foam after a cycle of injection. T stands for half-life period, which is decided from selected foam or foaming agent. t is elapsed time after the foam generated. This equation is used to calculate the remaining volume of foam generated from one-cycle injection. According to cyclic injection method, total amount of remaining foam can be calculated by adding the remaining volume of every cycle together. Foam generating time is assumed to be the time when both slugs of a complete cycle have finished injection. Total amount of remaining foam is calculated from equation below:

$$V_{totalfoam} = \sum_{t=1}^{n} V_{left} = \sum_{i=1}^{n} V_i \times \exp\left[-\frac{\ln 2}{T}(t - t_i)\right] \quad (9)$$

Then, volume that swept by foam $V_{foam}$ can be calculated with:

$$V_{foam} = \frac{V_{totalfoam}}{1 - S_{or} - S_{wc}} \quad (10)$$

$S_{wc}$ iepresents water saturation. $S_{or}$ is residual oil saturation, which equals to saturation of endpoint when permeability of oil equals to 0 in the foam oil relative permeability curve. The swept area of foam flooding zone $A_{foam}$ equals:

$$A_{foam} = \frac{V_{foam}}{\phi h} \quad (11)$$

volumetric sweep efficiency of foam sweep sub-zone:

According to FIG. 2, the foam sweep area, which has a good performance of profile control, is much smaller than the reservoir sweep zone. The front of this foam sweep sub-zone will never reach the at least one production well. It is assumed that injected fluid volume equals the volume of reservoir fluid being swept, and the fluid volume being swept equals to equation below, $$E_{Vfoam} = E_{Zfoam} \times E_{Afoam}$$

$E_{Afoam}$ stands for vertical sweep efficiency within the foam sweep sub-zone, which equals:

$$E_{Afoam} = \frac{A_{foam}}{A_{total}} \quad (12)$$

$E_{Zfoam}$ equals vertical sweep efficiency, which is calculated according to Craig's experimental pattern (1957). This pattern gives a method to calculate vertical sweep efficiency with different mobility ratio and the ratio of viscous force to gravity.

The definition of ratio of viscous force to gravity is showed below:

$$\frac{VISC}{G} = \frac{(\Delta p)_h}{(\Delta p)_V} = \frac{u_t \mu_o x}{k_x g \Delta \rho h} \quad (13)$$

In this formula $u_t$ is velocity of injected fluid inside reservoir, in m/day. $\mu o$ is viscosity of oil, Pa*s. x is the distance between the at least one injection well to the at least one production well. k is horizontal permeability, md. $\Delta \rho$ is density difference between injected fluid and oil. A fitted curve equation showing the relation, which is taken from existing pattern is:

$$E_Z = (-0.1135 M^3 + 1.6649 M^2 - 8.7893 M + 19.269) \times \quad (14)$$
$$\ln\left(\frac{VISC}{G}\right) - 16.91 \ln(M) + 44.1$$

M represents the mobility ratio between foam and oil. This equation can be used to calculate vertical sweep efficiency within the foam sweep sub-zone.

Displacement Efficiency within the Foam Sweep Sub-Zone:

In a light oil hydrocarbon reservoir, foam has much higher viscosity than brine or oil, and performs as a profile control agent. For this reason, it is assumed that movement of foam flooding is piston-like displacement. Displacement efficiency is considered as constant in this assumption, which equals to equation below, where $S_{oi}$ is initial oil saturation. $S_{or}$ is residual oil saturation. They are acquired from end point value of relative permeability curve:

$$E_{Dfoam} = 1 - \frac{S_{or}}{S_{oi}} \quad (15)$$

According to its definition, the foam zone recovery factor is equal to product which is multiplied from volumetric sweep efficiency and displacement efficiency, using an equation such as the following:

$$RF_{foam} = E_{Dfoam} \times E_{vfoam} \quad (16)$$

Water Sweep Sub-Zone:

The next area and calculations to achieve the method of the present invention relate to the water sweep sub-zone. The water sweep area comes from the collapse of foam, which is located in the front of the foam sweep sub-zone, where $\lambda_{surfactant}$ indicates for volume ratio of surfactant solution in every injection cycle. $V_i$ is total injected fluid volume of every injection cycle:

$$A_{water} = \lambda_{surfactant} \frac{\sum_{t=1}^{n} V_i - \sum_{t=1}^{n} V_{left}}{h\phi(1 - Sor - Swc)} \quad (17)$$

The volumetric sweep efficiency of the water sweep sub-zone is calculated as:

$$E_{Vwater} = E_{Zwater} \times E_{Awater} \quad (18)$$

$E_{Awater}$ is the volumetric sweep efficiency of the water sweep sub-zone:

$$E_{Awater} = \frac{A_{water}}{A_{total}} \quad (19)$$

$E_{Zwater}$ is the vertical sweep efficiency of the water sweep sub-zone. Calculation of vertical sweep efficiency for the water sweep sub-zone is the same as the calculation of vertical sweep efficiency for the foam sweep sub-zone, which is also calculated according to Craig's pattern with different mobility ratio.

Displacement Efficiency in the Water Sweep Sub-Zone

Before breakthrough, all the injected volume contributes to oil recovery of a new area inside the hydrocarbon reservoir. The average saturation of displaced fluid ahead of the front stays constant until injected fluid breaks through. For this reason, displacement efficiency also stays constant.

$$E_{Dwater} = 1 - \frac{S_{or}}{S_{oi}} \qquad (20)$$

In this calculation, $S_{oi}$ is initial oil saturation. $S_{or}$ is residual oil saturation. They are acquired from end point value of relative permeability curve.

Recovery Factor in the Water Sweep Sub-Zone:

According to its definition, recovery factor equals the volume of oil or product which is multiplied from volumetric sweep efficiency and displacement efficiency.

$$RF_{water} = E_{Dwater} \times E_{vwater} \qquad (21)$$

Gas Sweep Sub-Zone:

A similar set of calculations is used in the gas sweep sub-zone. Firstly it is necessary to calculate the gas sweep area, which comes from the collapse of foam, which is located in front of the water sweep sub-zone because of mobility difference.

$$A_{gas} = c \times \lambda_{gas} \frac{\sum_{t=1}^{n} V_{inj} - \sum_{t=1}^{n} V_{left}}{h\phi} \qquad (22)$$

In this calculation, $A_{gas}$ is the ratio of volume of gas to all the fluid injected in the same cycle. c is a coefficient considering the reaction and consumption of gas. For example, if air foam injection is selected, c equals to 0.9496 which indicates for absorption of $CO_2$ generated during low temperature oxidization process.

The volumetric sweep efficiency in the gas sweep sub-zone equals to $E_{Vgas}$.

$$E_{Vgas} = E_{Zgas} \times E_{Agas} \qquad (23)$$

$E_{Agas}$ is the sweep efficiency within the gas sweep sub-zone:

$$E_{Agas} = \frac{A_{gas}}{A_{total}} \qquad (24)$$

$E_{Zgas}$ is the vertical sweep efficiency in the gas sweep sub-zone. Calculation of vertical sweep efficiency for the gas sweep sub-zone is the same as the calculation of vertical sweep efficiency within the foam sweep sub-zone, which is also calculated according to Craig's pattern with different mobility ratio.

Before breakthrough, all the injected volume contributes to oil recovery in a new area inside reservoir. Average saturation of displaced fluid ahead of front stays constant until injected fluid breaks through. For this reason, displacement efficiency also stays constant—where $S_{oi}$ is initial oil saturation and $S_{or}$ is residual oil saturation:

$$E_{Dgas} = 1 - \frac{S_{or}}{S_{oi}} \qquad (25)$$

The next calculation for the gas sweep sub-zone is the gas zone recovery factor. According to its definition, recovery factor equals to product which is multiplied from volumetric sweep efficiency and displacement efficiency:

$$RF_{gas} = E_{Dgas} \times E_{Vgas} \qquad (26)$$

The reservoir recovery factor RF can be calculated according to recovery factor of each zone:

$$RF = RF_{foam} + RF_{water} + RF_{gas} \qquad (27)$$

If the summation of $A_{BTfoam}$, $A_{BTwater}$, and $A_{BTgas}$ is more than $A_{total}$, the system is considered to be broken through already:

$$A_{BTfoam} + A_{BTwater} + A_{BTgas} > A_{total}$$

In a circumstance where gas has broken through but the surfactant solution has not, volumetric sweep efficiency will be calculated using an empirical equation from a homogeneous case to estimate maximum area sweep efficiency after breakthrough. Then, FIG. 2 is used to modify original equation as consideration of heterogeneity. For a homogeneous reservoir, maximum area sweep efficiency at breakthrough can be calculated as:

$$E_{ABT} = C\sqrt{\frac{1+M}{2M}} \qquad (28)$$

C is a coefficient about well pattern. When the working scheme is five-spot, C equals to 0.718. When the working scheme is invert nine-spot, C equals to 0.525, or when working scheme is invert seven-spot, C equals to 0.743.

For a homogeneous reservoir, equation below is used to calculate maximum area sweep efficiency after breakthrough:

$$E_{AafterBT} = E_{ABT} + D \times \ln\left(\frac{W_{inj}}{W_{iBT}}\right) \qquad (29)$$

Where D is a coefficient about well pattern. When working scheme is five-spot, D equals to 0.2749. When working scheme is invert nine-spot, D equals to 0.201.

For a heterogeneous reservoir, results are modified according to pattern. Modification of the maximum area sweep efficiency calculation is focused on two points, maximum area sweep efficiency at breakthrough and theoretical maximum area sweep efficiency of a specific injected fluid. According to the reference about sweep efficiency calculation of heterogeneous reservoir, permeability variation (V) is chosen as the variable to represent influence of heterogeneity. Because the existing equation for maximum area sweep efficiency at breakthrough only has one variable which is mobility ratio, it is critical to get an intermediate variable. This intermediate variable can connect mobility ratio and permeability variation with sweep efficiency. According to pattern, maximum area sweep efficiency decreases as permeability variation increases. Meanwhile, maximum area sweep efficiency also decreases as mobility ratio increases. Once mobility ratio and permeability variation are decided, the maximum area sweep efficiency gained from pattern equals to which gained from the other higher mobility in homogeneous reservoir. This higher mobility ratio is the intermediate variable mentioned before, which is named as pseudo mobility ratio. It is defined as the mobility ratio in the homogeneous reservoir sweep zone which can get the same maximum area sweep efficiency with the other mobility ratio at certain permeability variation.

According to this physical explanation, permeability variation of a heterogeneous reservoir sweep zone is always higher than zero, so the pseudo mobility is always higher than the original. The equation of maximum area sweep efficiency at breakthrough with the consideration of heterogeneity is showed below. M* is pseudo mobility ratio.

$$E_{ABT} = C\sqrt{\frac{1+M^*}{2M^*}} \qquad (30)$$

Where C is a coefficient about well pattern. When working scheme is five-spot, C equals to 0.718. When working scheme is invert nine-spot, C equals to 0.525. When working scheme is invert seven-spot, C equals to 0.743.

After breakthrough, the equation below is used to calculate maximum area sweep efficiency after breakthrough in the heterogeneous reservoir sweep zone:

$$E_{AafterBT} = E_{ABT} + X \times D \times \ln\left(\frac{W_{inj}}{W_{iBT}}\right) \qquad (31)$$

When working scheme is five-spot, D equals to 0.2749. When working scheme is invert nine-spot, D equals to 0.201. X is a coefficient that sets up the maximum area sweep efficiency which tends towards the maximum area sweep efficiency $E_{Amax}$ at current mobility ratio and permeability variation.

Maximum area sweep efficiency of FIG. 2 is the experimental results when WOR equals 25, or 96.15% water percentage. Assuming this is the time the at least one production well stops, maximum area sweep efficiency is considered. $E_A$ (M, V) can split into two parts for curve fitting, smooth part $L_1$ at relative low permeability variation which does not change much in maximum area sweep efficiency as heterogeneity increases, and slash part $L_2$ at higher relative low permeability variation which changes remarkably as little change in heterogeneity. The position of cut-off points to these two parts is not constant, and it's a function of mobility ratio.

$$V_C = -0.063 \times \ln(M+0.1) + 0.5473 \qquad (32)$$

M is original mobility ratio. $V_c$ is the cut-off point between smooth part $L_1$ and slash part $L_2$. According to curve fitting results, when permeability variation V is less than $V_c$, the maximum areal sweep efficiency is the equation below:

$$E_{Amax} = -0.07076V + 0.8606 - 0.0605 \times \ln(M+0.1) \qquad (33)$$

When permeability variation V is higher than or equals $V_c$, the maximum area sweep efficiency for the reservoir sweep zone is the equation below:

$$E_{Amax} = \frac{E_{AC}}{V_C - 1} \times (V - V_C) + E_{AC} \qquad (34)$$

X is then determined according to equation of heterogeneous maximum area sweep efficiency after breakthrough, as follows:

$$X = \frac{E_{Amax} - E_{ABT}}{D \times \ln(W_{inj}/W_{bt})} \qquad (35)$$

Placing X back into the original equation, heterogeneous maximum area sweep efficiency after breakthrough can then be calculated.

Vertical Sweep Efficiency

The next set of calculations relates to the calculation of vertical sweep efficiency. Vertical sweep efficiency is calculated with the same method:

$$\frac{VISC}{G} = \frac{(\Delta p)_h}{(\Delta p)_V} = \frac{u_p \mu_o x}{k_x g \Delta \rho h} \qquad (36)$$

$$E_z = (-0.1135M^3 + 1.6649M^2 - 8.7893M + 19.269) \times$$
$$\ln\left(\frac{VISC}{G}\right) - 16.91\ln(M) + 44.1$$

Then, volumetric sweep efficiency is calculated as $E_V = E_Z \times E_A$

Displacement Efficiency after Breakthrough:

Displacement efficiency can be calculated with equation below, where $S_d$ is saturation of fluid that is being displaced and $S_{wc}$ indicates water saturation:

$$E_D = \frac{(1 - S_{wc}) - \bar{S}_{or}}{1 - S_{wc}} = \frac{S_d - S_{wc}}{1 - S_{wc}} \qquad (37)$$

Cumulative porous volume injected (PV) can be estimated with cumulative injection volume, where $B_w$ is volume factor of brine, $W_{inj}$ is cumulative injection volume, $\Phi$ is porosity and PV is multiple of porous volume injected:

$$PV = \frac{W_{inj} B_w}{Ah\phi\rho_w} \qquad (38)$$

According to flooding front theory, PV equals to reciprocal of differential of fractional flow of water to water saturation:

$$PV = 1 \bigg/ \frac{df_w}{dS_w} \qquad (39)$$

Because the ratio of relative permeability of oil to relative permeability of water is a function of water saturation, it can be written as below (a, b can be estimated with linear regression):

$$\frac{k_{ro}}{k_{rw}} = ae^{bS_w} \qquad (40)$$

Fractional flow of water can be expressed as equation below, where $\mu_o$ and $\mu_w$ are viscosity of oil and brine:

$$f_w = \frac{1}{1+M} = \frac{1}{1 + \frac{K_{ro}\mu_w}{\mu_o K_{rw}}} \quad (41)$$

In the next step thereafter the differential of fractional flow of water to water saturation can be written as below:

$$\frac{df_w}{dS_w} = \frac{-\frac{\mu_w}{\mu_o} abe^{bS_w}}{\left(1 + \frac{\mu_w}{\mu_o} ae^{bS_w}\right)^2} = \frac{-Mb}{(1+M)^2} \quad (42)$$

The mobility ratio of certain PV can be estimated according to this equation. Fractional flow of water at certain moment can be estimated with the mobility ratio which is just calculated. According to diffusivity equation of water, average water saturation can be calculated with fractional flow of water:

$$\overline{S}_w = -\frac{1}{b}\ln\left(\left(\frac{1}{f_w} - 1\right)\frac{1}{\alpha}\frac{\mu_o}{\mu_w}\right) \quad (43)$$

Finally, average displacement efficiency can be calculated as below:

$$E_D = \frac{\overline{S}_w - S_{wc}}{1 - S_{wc}} \quad (45)$$

Recovery Factor after Breakthrough:

As defined, reservoir recovery factor equals the product which is multiplied from volumetric sweep efficiency and displacement efficiency:

$$RF = E_D \times E_V \quad (46)$$

Once water breaks through, according to flow fluid theory, it would flow into the area being swept by gas before entering new area. This mechanism works like the effect of permeability variation, which means that a dominant channel is formed in the area swept by gas. In order to express this mechanism correctly, a resistance factor of permeability Kx is introduced.

$$Kv^* = Kx \times V$$

Then, using this $K_v^*$ to replace original permeability variation V to calculate recovery factor after breakthrough of water.

FIGS. 6 through 17 show sample plotted graphs of flooding operations generated in accordance with the method of the present invention, with different reservoir and flooding parameters. These Figures are intended in a general sense to demonstrate the utility and performance of the method of the present invention, but should not be considered to limit the scope of the invention outlined herein which is intended to cover the entire scope of the claims.

In each of FIG. 6 through FIG. 17, the curve labeled as a two-front curve is produced by application of the method of estimating oil recovery factor from a foam flooded reservoir outlined herein, while the one-front curve result is a simplification of this model which only considers one gas front breakthrough. The curve labeled with simulation is given out by using computer numerical simulation software (CMG).

Figure 18:
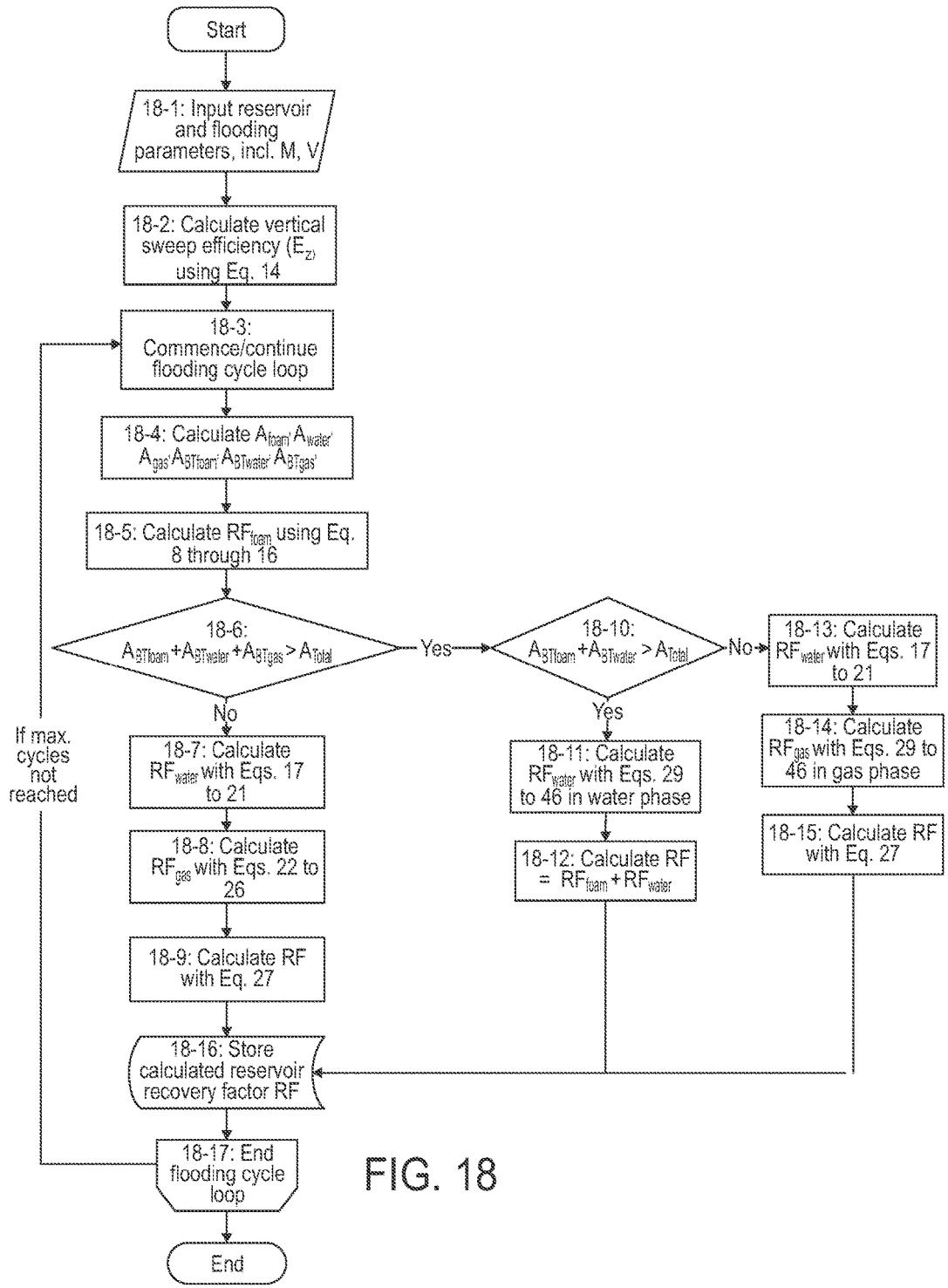
FIG. 18 is a flowchart demonstrating the steps of one embodiment of the method of the present invention executed by processor instructions on computer-readable storage medium.
Figure 19:
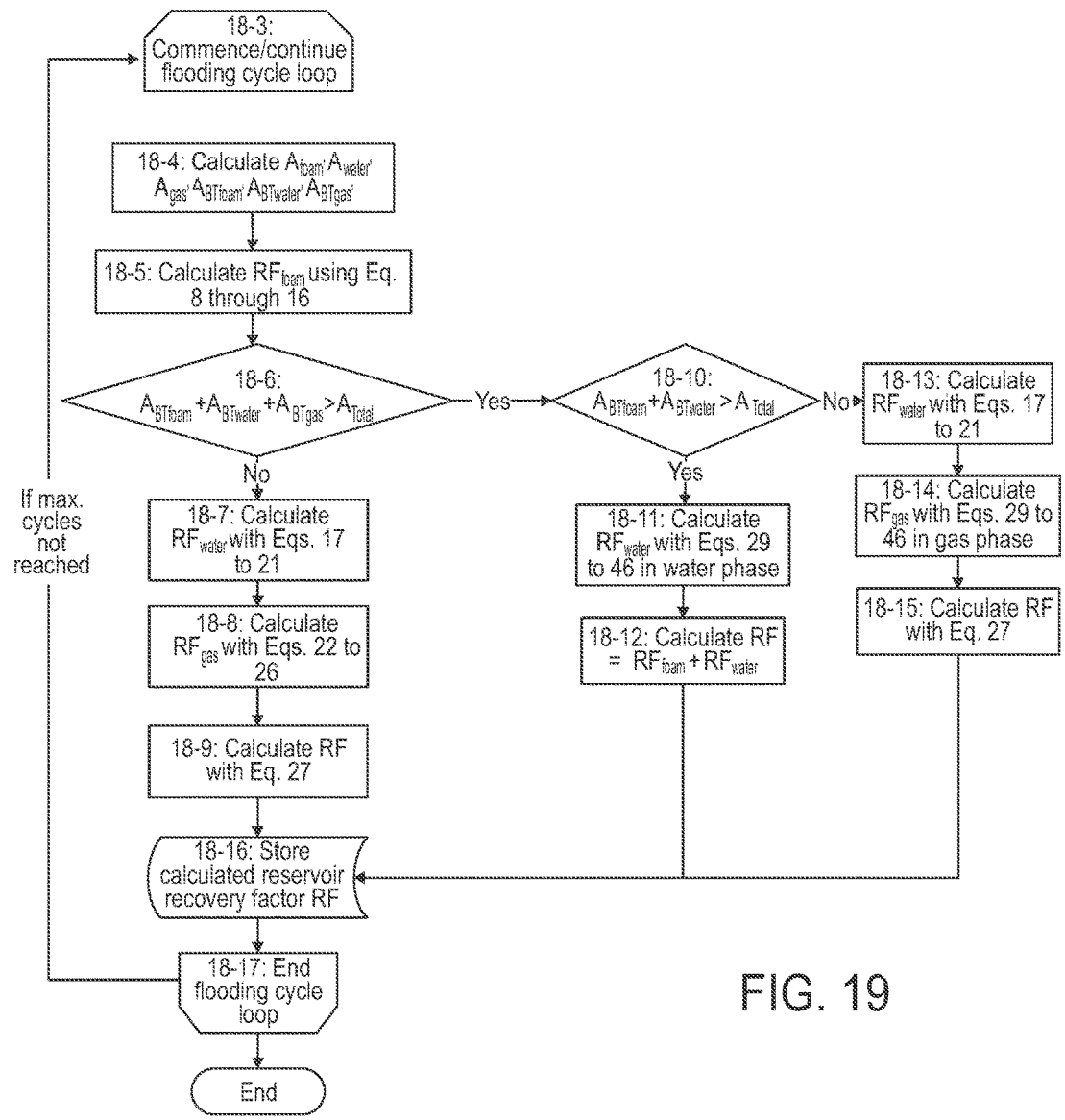
FIG. 19 is an exploded view of the steps of the flooding cycle loop of FIG. 18.

Computer Software:

FIG. 18 and FIG. 19 are flow charts showing one embodiment of the steps performed in a computer software iteration of the method of the present invention. Again it will be understood to those skilled in the art of computer software design that many different types of software could be used, including the purpose building of software for this purpose or the use of preexisting mathematical modeling software which has the ability to be customized to conduct the required calculations in the execution of the method hereof. The method of FIG. 18 and FIG. 19 will be understood to generally speaking outline the method which will be conducted by a computer executing processor instructions within a computer readable storage medium as generally speaking outlined herein—different formulae and approaches could be introduced to the overall method without departing from the intended scope and coverage hereof.

At the start of the method of FIG. 18, there is shown at Step 18-1 the capture or data input of reservoir and flooding parameters. The capture of reservoir and flooding parameters would typically include capturing parameters such as mobility ratio and permeability variation. These could be captured from a sensor bus, human data entry terminal or display, or from stored data on a disk or other memory or storage medium.

Once the reservoir and flooding parameters have been captured, Step 18-2 shows the calculation of the vertical sweep efficiency within the reservoir sweep zone—the flow chart of FIG. 18 shows an indication that Equation 14 as included above would be the sample equation which would be used in these calculations—the various steps in the flow chart of FIG. 18 indicate the mathematical models or equations from the remainder of this specification which is believed would be used for execution of that particular step. Again it goes without saying that even if the specific formulae used to achieve this business method step were changed, it would still be accomplished using the same overall approach and is considered to be within the scope hereof.

Following the calculation of vertical sweep efficiency at 18-2, the flooding cycle loop is commenced—that is to say that the calculations related to the oil recovery factor from the reservoir sweep zone will be executed once for each selected flooding cycle, in the flooding cycle loop that extends between Steps 18-3 to 18-17 of this figure.

The first step within the flooding cycle loop shown in FIG. 18 is the calculation of various areas including the foam sweep area, the gas sweep area and the water sweep area, as well as the foam breakthrough area, the gas breakthrough area and the water breakthrough area. The breakthrough areas are outlined in further detail elsewhere herein as well. Determination of the existence or size of the breakthrough areas is impactful in calculations further down in the method within the flooding cycle loop.

Following the completion of the area calculations shown at 18-4, Step 18-5 indicates the calculation of the foam zone recovery factor, which is calculated using equations 8 through 16.

Following the calculation of the foam zone recovery factor, being the oil recovery factor or oil recovery contribution from the foam sweep sub-zone, Step 18-6 shows the first logic block or step which is used to determine the next calculations to be applied in the method of the present invention. The total of the foam breakthrough area, the water breakthrough area and the gas breakthrough area is compared to the total sweep area of the reservoir sweep zone within the hydrocarbon reservoir. If the three breakthrough areas total more than the total sweep area, the calculation logic would go to Step 18-10, whereas if the total sweep area is greater than the total of the three breakthrough areas, the calculation would move on to Step 18-7. This effectively comprises the selection of the recovery factor calculation method.

Step 18-7 shows the calculation of the water zone recovery factor, using equations 17 through 21, followed by the calculation of the gas zone recovery factor using equations 22 to 26. Having calculated each of the foam zone recovery factor, the gas zone recovery factor and the water zone recovery factor, the reservoir recovery factor can then be calculated, shown at Step 18-9, using equation 27, and stored in a data storage Step 18-16.

Referring in the alternative to a scenario in which the total breakthrough area exceeds the total sweep area, moving to the second logic step shown at 18-10, the total of the foam breakthrough area and the water breakthrough area would be compared to the total sweep area. If the total sweep area is less than the total of the foam breakthrough area and the water breakthrough area, Step 18-11 shows the calculation of the water zone recovery factor using equations 29 to 46 in the water phase, followed by the calculation of the reservoir recovery factor by adding the foam zone recovery factor and the water zone recovery factor. On the no leg of the logic of Step 18-10, calculated with equation 17 to 21, followed by Step 18-14 showing the gas zone recovery factor calculated with equations 29 to 46 in the gas phase. Finally, the reservoir recovery factor would be calculated in accordance with equation 27, shown at Step 18-15.

Following the completion of the calculation of the reservoir recovery factor and its storage at Step 18-16 with respect to each flooding cycle, the flooding cycle loop ends at Step 18-17. If the maximum number of flooding cycles selected for the method has not been completed, the loop would revert back to Step 18-3 and move on to the calculations for the next flooding cycle by incrementing the number thereof. Alternatively if the maximum number of cycles has been reached, the flooding cycle loop would end and the saved calculated reservoir recovery factors could be used in graphing or other analysis.

The overall development of a computer program that can execute a mathematical model such as is outlined herein will be understood to those skilled in the art of software design and all approaches to the development of purpose built or customization of modelling software to execute the method outlined herein are all intended to be within the scope of the present invention.

Overall Results:

Table 1 and Table 2 show two sets of calculation results calculated in accordance with the conventional CMG method and the method of the present invention, for scenarios with different reservoir and flooding parameters namely different permeability variation and injection rate. Table 1 shows the results of a one front case, without abrupt production after gas breakthrough. Table 2 shows the results of a two front scenario, in which the influence of different mobility ratio is considered after breakthrough.

Recovery factors after 5-year production and 10-year production of each case are listed in the tables. Comparing the previous method CMG results with the results of the present invention the difference in percentage is also calculated in the table for each case.

According to these results, both methods can be used to estimate oil recovery factor and provide accurate results comparing with CMG. According to the comparison with simulation, the two-front method gives better results in the case of a less heterogenous hydrocarbon reservoir, or in early stages of oil recovery from the hydrocarbon reservoir, and the one-front method provides a better model and result in cases of a more heterogenous hydrocarbon reservoir or in later stages of oil recovery from the hydrocarbon reservoir.

V is permeability variation, which is used to describe the heterogeneity of reservoir. $u_{gas}$ is gas injection rate (SC), $u_{water}$ is surfactant solution injection rate (SC).

TABLE 1

Result comparison between one-front method and simulation

| V | $u_{gas}/$ $m^3D^{-1}$ | $u_{water}/$ $m^3D^{-1}$ | CMG RF after 5 years/% | Program RF after 5 years/% | Difference in RF after 5 years/% | CMG RF after 10 years/% | Program RF after 10 years/% | Difference in RF after 10 years/% |
|---|---|---|---|---|---|---|---|---|
| 0.1 | 800 | 12 | 16.45 | 20.34 | −3.89 | 27.69 | 29.86 | −2.17 |
|  | 200 | 4 | 9.49 | 5.86 | 3.63 | 14.59 | 12.04 | 2.55 |
|  | 800 |  | 12.37 | 14.98 | −2.61 | 21.9 | 23.58 | −1.68 |
|  | 1200 |  | 15.56 | 18.07 | −2.51 | 27.92 | 25.89 | 2.03 |
| 0.4 | 800 | 12 | 15.93 | 18.94 | −3.01 | 27.17 | 27.81 | −0.64 |
|  | 200 | 4 | 9.05 | 5.37 | 3.68 | 13.92 | 11.03 | 2.89 |
|  | 800 |  | 11.75 | 14.07 | −2.32 | 20.51 | 22.07 | −1.56 |
|  | 1600 |  | 14.75 | 17.21 | −2.46 | 26.1 | 24.59 | 1.51 |
| 0.8 | 800 | 12 | 8.07 | 8.7 | −0.63 | 13.08 | 11.9 | 1.18 |
|  | 200 | 4 | 5.034 | 4.55 | 0.484 | 8.54 | 6.42 | 2.12 |
|  | 800 |  | 5.84 | 7.06 | −1.22 | 9.53 | 9.91 | −0.38 |
|  | 1600 |  | 6.52 | 7.71 | −1.19 | 11.26 | 10.18 | 1.08 |

TABLE 2

Result comparison between two-front method and simulation

| V | $u_{gas}/$ $m^3D^{-1}$ | $u_{water}/$ $m^3D^{-1}$ | CMG RF after 5 years/% | Program RF after 5 years/% | Difference in RF after 5 years/% | CMG RF after 10 years/% | Program RF after 10 years/% | Difference in RF after 10 years/% |
|---|---|---|---|---|---|---|---|---|
| 0.1 | 800 | 12 | 16.45 | 18.38 | −1.93 | 27.69 | 27.7 | −0.01 |
|  | 200 | 4 | 9.49 | 5.6 | 3.89 | 14.59 | 10.59 | 4 |

TABLE 2-continued

Result comparison between two-front method and simulation

| V | $u_{gas}/$ $m^3D^{-1}$ | $u_{water}/$ $m^3D^{-1}$ | CMG RF after 5 years/% | Program RF after 5 years/% | Difference in RF after 5 years/% | CMG RF after 10 years/% | Program RF after 10 years/% | Difference in RF after 10 years/% |
|---|---|---|---|---|---|---|---|---|
|  |  | 800 | 12.37 | 12.02 | 0.35 | 21.9 | 20.12 | 1.78 |
|  |  | 1200 | 15.56 | 14.3 | 1.26 | 27.92 | 21.73 | 6.19 |
| 0.4 | 12 | 800 | 15.93 | 15.68 | 0.25 | 27.17 | 24.2 | 2.97 |
|  | 4 | 200 | 9.05 | 5.368 | 3.682 | 13.92 | 8.52 | 5.4 |
|  |  | 800 | 11.75 | 9.1 | 2.65 | 20.51 | 16.21 | 4.3 |
|  |  | 1600 | 14.75 | 10.67 | 4.08 | 26.1 | 17.39 | 8.71 |
| 0.8 | 12 | 800 | 8.07 | 7.1 | 0.97 | 13.08 | 10.13 | 2.95 |
|  | 4 | 200 | 5.034 | 3.32 | 1.714 | 8.54 | 5.19 | 3.35 |
|  |  | 800 | 5.84 | 4.71 | 1.13 | 9.53 | 7.28 | 2.25 |
|  |  | 1600 | 6.52 | 4.8 | 1.72 | 11.26 | 6.98 | 4.28 |

It will be recognized that the specific steps of the method and computer software of the system described herein, are not considered to be limiting to the scope of the invention. Those of skill in the art will readily recognize and be able to select materials and components that will accomplish the objectives of the invention without requiring any inventive skill.

It should also be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of estimating oil recovery factor from a foam flooded reservoir, the oil recovery factor from the foam flooded reservoir being a reservoir recovery factor, said method comprising:
   defining a reservoir sweep zone, being a volumetric area within a hydrocarbon reservoir between at least one injection well and at least one production well, wherein gas and liquid surfactant injected into the at least one injection well in at least one flooding cycle will sweep oil through the reservoir sweep zone towards the at least one production well for extraction therefrom;
   executing a flooding cycle loop, modeling the reservoir recovery factor within the reservoir sweep zone for each flooding cycle while conducting the flooding cycle by:
      determining reservoir and flooding parameters with respect to the reservoir sweep zone based on a current state of gas and liquid surfactant injection into the reservoir sweep zone;
      using the reservoir and flooding parameters, subdividing the reservoir sweep zone into three sweep sub-zones, being a foam sweep sub-zone, a water sweep sub-zone and a gas sweep sub-zone;
      in a calculation step:
         calculating a vertical sweep efficiency and a volumetric sweep efficiency within each of the sweep sub-zones;
         calculating a total sweep area for the reservoir sweep zone, being a volumetric area of the reservoir sweep zone swept by foam at the moment of the current flooding cycle;
         calculating a foam sweep area, being a volumetric area of the foam sweep sub-zone swept by foam at the moment of the current flooding cycle;
         calculating a water sweep area, being a volumetric area of the water sweep sub-zone swept by water at the moment of the current flooding cycle;
         calculating a gas sweep area, being a volumetric area of the gas sweep sub-zone swept by gas at the moment of the current flooding cycle;
         calculating a foam breakthrough area, being a volumetric area of the foam sweep sub-zone being broken through by existing foam within the flooding cycle, which includes the foam sweep area and a foam bypass area therearound caused by the mobility difference between foam and oil;
         calculating a water breakthrough area, being a volumetric area of the water sweep sub-zone being broken through by existing water within the flooding cycle, which includes the water sweep area and a water bypass area therearound caused by the mobility difference between water and oil;
         calculating a gas breakthrough area, being a volumetric area of the gas sweep sub-zone being broken through by existing gas within the flooding cycle, which includes the gas sweep area and a gas bypass area therearound caused by the mobility difference between gas and oil; and
         calculating a total breakthrough area, being a total of the foam breakthrough area, the water breakthrough area and the gas breakthrough area; in a recovery factor estimation step:
         calculating a foam zone recovery factor, being the oil recovery factor contributed from the foam sweep sub-zone;
         calculating a water zone recovery factor being the oil recovery factor contributed from the water sweep sub-zone;
         calculating a gas zone recovery factor being the oil recovery factor contributed from the gas sweep sub-zone;
         selecting a reservoir recovery factor calculation method to be used by comparison of the values of the total breakthrough area and the total sweep area; and
         executing the selected reservoir recovery factor calculation.

2. The method of claim 1, further comprising storing the calculated reservoir recovery factor after completing each flooding cycle loop.

3. The method of claim 2, further comprising plotting at least one graph following the completion of the flooding cycle loop, with the stored calculated reservoir recovery factor for each flooding cycle on one axis thereof.

4. The method of claim 3, wherein the relative time of the flooding cycle is plotted on the other axis of at least one graph.

5. The method of claim 3, wherein reservoir and flooding parameters of the hydrocarbon reservoir or the flooding operation are plotted on the second axis of the at least one graph.

6. The method of claim 1 wherein the reservoir and flooding parameters are used as required in each of the calculations within the calculation step.

7. The method of claim 1, wherein the reservoir and flooding parameters are used as required in each of the calculations within the recovery factor estimation step.

8. The method of claim 1, wherein the reservoir recovery factor calculation which is selected if the total breakthrough area is less than the total sweep area comprises totalling the foam zone recovery factor, the water zone recovery factor and the gas zone recovery factor to yield the reservoir recovery factor.

9. The method of claim 1, wherein the reservoir recovery factor calculation which is selected if the total breakthrough area is more than the total sweep area comprises:
for each of the three sweep sub-zones:
calculating maximum area sweep efficiency;
calculating heterogenous sweep efficiency after breakthrough;
calculating area sweep efficiency after breakthrough and the heterogenous sweep efficiency after breakthrough;
calculating displacement efficiency; and
calculating a sub-zone recovery factor for the sub-zone in question using the displacement efficiency and the volumetric sweep efficiency corresponding to the sub-zone; and
totalling the calculated sub-zone recovery factors for all three sweep sub-zones to yield the reservoir recovery factor.

10. The method of claim 9, wherein the reservoir and flooding parameters are used as required in each of the calculations making up the reservoir recovery factor calculation.

11. The method of claim 1, wherein the number of flooding cycles is one.

12. The method of claim 1, wherein the number of injection wells is one.

13. The method of claim 1, wherein the number of injection wells is more than one.

14. The method of claim 1, wherein the number of flooding cycles is more than one.

15. The method of claim 1, wherein the number of production wells is one.

16. The method of claim 1, wherein the number of production wells is more than one.

17. The method of claim 1, wherein the reservoir and flooding parameters are selected from the group of at least one of mobility ratio and permeability variation.

18. A non-transitory computer-readable storage medium for use in the estimation of oil recovery factor in a foam flooded hydrocarbon reservoir, the computer-readable storage medium including instructions that when executed by a computer, cause the computer to:
define a reservoir sweep zone, being a volumetric area within a hydrocarbon reservoir between at least one injection well and at least one production well, wherein gas and liquid surfactant injected into the at least one injection well in at least one flooding cycle will sweep oil through the reservoir sweep zone towards the at least one production well for extraction therefrom;
for each flooding cycle:
determine reservoir and flooding parameters with respect to the reservoir sweep zone based on a current state of gas and liquid surfactant injection into the reservoir sweep zone;
using the reservoir and flooding parameters, subdividing the reservoir sweep zone into three sweep sub-zones, being a foam sweep sub-zone, a water sweep sub-zone and a gas sweep sub-zone;
in a calculation step:
calculate a vertical sweep efficiency and a volumetric sweep efficiency within each of the sweep sub-zones;
calculate a total sweep area for the reservoir sweep zone, being a volumetric area of the reservoir sweep zone swept by foam at the moment of the current flooding cycle;
calculate a foam sweep area, being a volumetric area of the foam sweep sub-zone swept by foam at the moment of the current flooding cycle;
calculate a water sweep area, being a volumetric area of the water sweep sub-zone swept by water at the moment of the current flooding cycle;
calculate a gas sweep area, being a volumetric area of the gas sweep sub-zone swept by gas at the moment of the current flooding cycle;
calculate a foam breakthrough area, being a volumetric area of the foam sweep sub-zone being broken through by existing foam within the flooding cycle, which includes the foam sweep area and a foam bypass area therearound caused by the mobility difference between foam and oil;
calculate a water breakthrough area, being a volumetric area of the water sweep sub-zone being broken through by existing water within the flooding cycle, which includes the water sweep area and a water bypass area therearound caused by the mobility difference between water and oil;
calculate a gas breakthrough area, being a volumetric area of the gas sweep sub-zone being broken through by existing gas within the flooding cycle, which includes the gas sweep area and a gas bypass area therearound caused by the mobility difference between gas and oil; and
calculate a total breakthrough area, being a total of the foam breakthrough area, the water breakthrough area and the gas breakthrough area;
in a recovery factor estimation step:
calculate a foam zone recovery factor, being the oil recovery factor contributed from the foam sweep sub-zone;
calculate a water zone recovery factor being the oil recovery factor contributed from the water sweep sub-zone;
calculate a gas zone recovery factor being the oil recovery factor contributed from the gas sweep sub-zone;

select a reservoir recovery factor calculation method to be used by comparison of the values of the total breakthrough area and the total sweep area; and execute the selected reservoir recovery factor calculation.

19. The computer-readable storage medium of claim 18, wherein the reservoir and flooding parameters are used as required in each of the calculations within the calculation step.

20. The computer-readable storage medium of claim 18, wherein the reservoir and flooding parameters are used as required in each of the calculations within the recovery factor estimation step.

21. The computer-readable storage medium of claim 18, wherein the reservoir recovery factor calculation which is selected if the total breakthrough area is less than the total sweep area comprises total the foam zone recovery factor, the water zone recovery factor and the gas zone recovery factor to yield the reservoir recovery factor.

22. The computer-readable storage medium of claim 18, wherein the reservoir recovery factor calculation which is selected if the total breakthrough area is more than the total sweep area comprises:

for each of the three sweep sub-zones:
calculate maximum area sweep efficiency;
calculate heterogenous sweep efficiency after breakthrough;
calculate area sweep efficiency after breakthrough and the heterogenous sweep efficiency after breakthrough;
calculate displacement efficiency; and
calculate a sub-zone recovery factor for the sub-zone in question using the displacement efficiency and the volumetric sweep efficiency corresponding to the sub-zone; and total the calculated sub-zone recovery factors for all three sweep sub-zones to yield the reservoir recovery factor.

23. The computer-readable storage medium of claim 22, wherein the reservoir and flooding parameters are used as required in each of the calculations make up the reservoir recovery factor calculation.

24. The computer-readable storage medium of claim 18, wherein the instructions further configure the computer to store the calculated reservoir recovery factor for each flooding cycle.

25. The computer-readable storage medium of claim 24, wherein the method further comprises plot a graph with the reservoir recovery factor for each flooding cycle on one axis thereof.

26. The computer-readable storage medium of claim 18, wherein the reservoir and flooding parameters are selected from the group of at least one of mobility ratio and permeability variation.

* * * * *